US008010600B2

(12) United States Patent
Okamura

(10) Patent No.: US 8,010,600 B2
(45) Date of Patent: Aug. 30, 2011

(54) DATA PROCESSING METHOD, DATA PROCESSING APPARATUS, AND RECORDING MEDIUM

(75) Inventor: Hideaki Okamura, Tokyo (JP)

(73) Assignee: Sony Corporation (JP)

( * ) Notice: Subject to any disclaimer, the term of this patent is extended or adjusted under 35 U.S.C. 154(b) by 283 days.

(21) Appl. No.: 12/080,611

(22) Filed: Apr. 4, 2008

(65) Prior Publication Data
US 2008/0256240 A1    Oct. 16, 2008

Related U.S. Application Data

(60) Division of application No. 11/265,240, filed on Nov. 2, 2005, now abandoned, which is a continuation of application No. 10/112,296, filed on Mar. 27, 2002.

(30) Foreign Application Priority Data

Mar. 30, 2001    (JP) ................................ P2001-100995

(51) Int. Cl.
    *G06F 15/16*    (2006.01)
(52) U.S. Cl. ......................................... 709/203; 709/224
(58) Field of Classification Search .................. 709/203, 709/226, 224
    See application file for complete search history.

(56) References Cited

U.S. PATENT DOCUMENTS

| | | | |
|---|---|---|---|
| 6,463,445 B1 | 10/2002 | Suzuki et al. | |
| 6,601,056 B1 | 7/2003 | Kagle et al. | |
| 6,654,783 B1 | 11/2003 | Hubbard | |
| 6,721,780 B1 | 4/2004 | Kasriel et al. | |
| 7,065,575 B1 | 6/2006 | Machiraju et al. | |
| 7,467,212 B2 | 12/2008 | Adams et al. | |
| 2002/0169877 A1 | 11/2002 | Bantz et al. | |
| 2003/0033345 A1 | 2/2003 | Keefer et al. | |

FOREIGN PATENT DOCUMENTS

| | | | |
|---|---|---|---|
| JP | 63254556 A | 10/1988 |
| JP | 09247194 A | 9/1997 |
| JP | 10027109 A | 1/1998 |
| JP | 2000165419 A | 6/2000 |
| JP | 2000187630 A | 7/2000 |

OTHER PUBLICATIONS

Larry T. Chen and Tatsya Suda, University of California, Irvine, "Designing Mobile Computing Systems Using Distributed Objects" IEEE Communication Magazine, Feb. 1997.

Office Action from Japanese Application No. 2001-100995, dated Jun. 29, 2010.

*Primary Examiner* — David Lazaro
(74) *Attorney, Agent, or Firm* — Lerner, David, Littenberg, Krumholz & Mentlik, LLP

(57) ABSTRACT

The present invention has enabled computing resources existing in domestic network systems to be utilized with a maximum efficiency. Actual condition of the connection of client apparatuses to a domestic network and overall computing resources of the domestic network are integrally controlled by a personal computer functioning itself as a private server. When a PDA outputs a request to a personal computer for downloading image data on a server, the image data is downloaded and stored in a hard disk area owned by the personal computer and offered to the PDA. A connected condition of the client apparatuses to the domestic network is constantly monitored. Even when any of the client apparatuses is provisionally disconnected from the network, proper service is continuously rendered by applying the computing resources offered to the client apparatus.

4 Claims, 16 Drawing Sheets

DATA PROCESSING METHOD, DATA PROCESSING APPARATUS, AND RECORDING MEDIUM

CROSS REFERENCE TO RELATED APPLICATION

This application is a divisional application of U.S. application Ser. No. 11/265,240 filed Nov. 2, 2005, the disclosure of which is hereby incorporated by reference herein, and claims priority from Japanese Patent Application No. P2001-100995 filed on Mar. 30, 2001.

BACKGROUND OF THE INVENTION

1. Field of the Invention

The present invention relates to a data processing method, a data processing apparatus, and a recording medium, which are respectively capable of effectively utilizing computing resources of various apparatuses, connected to a network constructed at home in particular.

2. Description of Related Art

Nowadays, as a result of construction of a communication network at home, personal computers (PC) and/or non-computer apparatus have been mutually connected to each other via a network. Such non-computer apparatuses include those conventional home information appliances such as a digital television set, a video cassette recorder (VCR), a set-top boxe (STB), and a robot. Further, such non-computer apparatuses also include a portable terminal unit such as a personal digital assistant (PDA) and a portable telephone set, for example. Any of these apparatuses has computing function and is capable of mutually exchanging data via a network. Further, any of these apparatuses is connected to the Internet via a gateway and capable of downloading various data and programs from one or more servers on the Internet.

Those apparatuses include such apparatuses containing allowance in terms of computing resources, such as CPU (central processing unit) function, a memory and a hard disk. These apparatuses will be called "resource-abundant apparatuses" in the following description. In addition, those apparatuses also include such apparatuses devoid of sufficient computing resources such as a PDA and a portable telephone, for example. These will be called "resource-scarcity apparatuses" in the following description. Any of these resource-scarcity apparatuses merely contains such computing resources just enough to sustain own functional capability.

In such a case in which such resource-scarcity apparatuses are mutually connected to those resource-abundant apparatuses via networks to be capable of communicating with each other, if it is possible for the resource-scarcity apparatuses to use computing resources of the resource-abundant apparatuses, the resource-scarcity apparatuses will potentially be able to exert such capability beyond its original function. Further, if it is possible to offer computing resources proper to the resource-abundant apparatus to the resource-scarcity apparatuses, it will become possible to integrally and effectively utilize such computer resources present in a domestic network.

For example, if a hard-disc stored in a personal computer is offered to a PDA, in other words, if the PDA is allowed to use some area of the hard disk of the PC, the PDA will be able to preserve image data beyond the original memory capacity of the PDA in the hard disk of the PC. Further, if a portable telephone is allowed to use a CPU of the PC, that is, computing capability of the CPU, it becomes possible for the portable telephone to execute more complicated and greater-size programs. Nevertheless, there is still a problem that there has been no practical means for allowing the resource-scarcity apparatus to use computing resources proper to the resource-abundant apparatuses to the resource-scarcity apparatuses in the conventional domestic network environment.

For example, conventionally, there have been such technologies titled as "Jini" (one of registered trade marks of Sun Microsystems Inc., U.S.A.) and "UpnP" (Universal Plug and Play) in software frame works dealing with such network environment constructed with non-computer apparatuses. Nevertheless, even though any of the above software frame works is fitted with a mechanism for automating initializing mechanism pertaining to connection between apparatuses, there has been a critical problem that the software frame works still fail to support a function pertaining to control of resources after implementing mutual connection between them.

In a conventional distribution computer system utilized in an office of a business enterprise and a laboratory of a university, which comprises a plurality of computers, there is provided a resources management mechanism in which the capacity of hard disk drives of servers are shared by other computers. A computer system within a domestic network system (hereinafter, referred to as "domestic network system") can be considered to be a kind of distributing computer system. It is also possible to utilize a technique used in the conventional distributing computer system in the domestic network system.

Nevertheless, such a conventional distributing computer system does not take two important characteristic features inherent in the domestic network system into account. The first characteristic feature is that the distributing computer system is solely utilized by specific users. In other words, only members in a family share the apparatuses and exchange data via the network. Because of this, there are various requirements different from one family to another. For example, it is conceived that there is a specific demand in such a family including a member interested in video editing as to make a priority in the communication between a VCR and a personal computer utilized for editing video to be higher than a priority given in another communication between other apparatuses. In many cases, such a demand from a user is not generated until the user operates proper function of the domestic network system via connection of related apparatuses.

The second characteristic feature of the domestic network system is that physical variation in a status of apparatuses occurs frequently. The physical variation in the status of the apparatus implies variation related to connection to and disconnection from the network. Inasmuch as domestic network system contains many movable apparatuses and power source is frequently turned ON and OFF, such variation caused by disconnection of apparatuses from the network followed by recovery of connection thereto frequently occurs. In a case of the domestic network system, even when apparatuses connected to the network ever incurs the above physical variation, such services including proper control of resources should be preserved continuously.

For example, a case may be realized that a mechanism in which a PC, instead of a PDA, collects data frequently accessed by a certain device, is combined with a resource management mechanism so as to hold the latest version of data in a hard disk area of the PC, which the PDA is allowed to use. It is desired that the system is not dependent on a physical condition of the PDA. In other words, it is desired that this system should be operated continuously even when the PDA is disconnected from the network.

It is essential that the above system under operation is able to properly cope with a demand from a user and physical variation of an apparatus as described above. That is, the system is required to dynamically cope with user's demand and physical variation of apparatuses. Such function compatible with user's demand and physical variation of apparatuses is called "dynamic adaptability".

Since none of conventional domestic network systems has ever taken the above-mentioned characteristic features, whenever devising to incorporate the dynamic adaptability, a critical problem is always generated in that complicated and ineffectual works are required by way of individually changing a basic structure of a server system in correspondence with each device and function, for example.

SUMMARY OF THE INVENTION

In view of the above-mentioned problems, the present invention provides a data processing method capable of introducing a resources offering system into a domestic network system and effectually utilizing computing resources existing in the domestic network system.

The present invention also provides a data processing method bilaterally incorporating "dynamic adaptability" fully taking characteristic features s of the domestic network system into consideration and a resources offering system.

The present invention further provides a recording medium having recorded therein system software capable of realizing the above-referred data processing methods, and the present invention also provides a data processing apparatus fitted with the recording medium.

In order to fully solve the above problems, according to a first aspect of the present invention, there is provided a data processing apparatus capable of effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing apparatus according the first aspect of the present invention comprises connecting means, computing resource offering means, and condition notifying means. The connecting means connects the data processing apparatus to the network formed to have the limited operating range. The computing resource offering means offers a computing resource to the second information apparatus connected to the network. The condition notifying means notifies the data processing apparatus of a physical condition of the second information apparatus. In the data processing apparatus, based on the notice from the condition notifying means, if it is identified that the second information apparatus is not connected to the network physically, the data processing apparatus provides a service rendered to the second information apparatus to the computing resource offered to the second information apparatus by the computing resource offering means.

According to a second aspect of the present invention, there is provided a data processing method for effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method according the second aspect of the present invention comprises a connecting step, a computing resource offering step, and a condition notifying step. In the connection step, a connection between the network and the information apparatuses is made. In the computing resource offering step, a computing resource is offered to the second information apparatus connected to the network. In the condition notifying step, a physical condition of the second information apparatus is notified. In accordance with a notice in the condition notifying step, if it is identified that the second information apparatus is not connected to the network physically, a service rendered to the second information apparatus is provided to the computing resource offered to the second information apparatus in the computing resource offering step.

According to a third aspect of the present invention, there is provided a data processing program for enabling a computer unit to execute a data processing method for effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method executed according the third aspect of the present invention comprises a connecting step, a computing resource offering step, and a condition notifying step. In the connection step, a connection between the network and the information apparatuses is made. In the computing resource offering step, a computing resource is offered to the second information apparatus connected to the network. In the condition notifying step, a physical condition of the second information apparatus is notified. According to the program, if it is identified that the second information apparatus is not connected to the network physically in accordance with a notice in the condition notifying step, a service rendered to the second information apparatus is provided to the computing resource offered to the second information apparatus in the computing resource offering step.

According to a fourth aspect of the present invention, there is provided a recording medium having recorded therein a data processing program for enabling a computer unit to execute a data processing method for effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method according the second aspect of the present invention comprises a connecting step, a computing resource offering step, and a condition notifying step. In the connection step, a connection between the network and the information apparatuses is made. In the computing resource offering step, a computing resource is offered to the second information apparatus connected to the network. In the condition notifying step, a physical condition of the second information apparatus is notified. According to the program, if it is identified that the second information apparatus is not connected to the network physically in accordance with a notice in the condition notifying step, a service rendered to the second information apparatus is provided to the computing resource offered to the second information apparatus in the computing resource offering step.

The first aspect of the present invention may be modified to have request receiving means for receiving a request transmitted from the second information apparatus for delivery of services rendered to client's apparatuses. In response to the request received via the request receiving means, the data processing apparatus offers a computing resource via the computing resources offering means.

The second aspect of the present invention may be modified to have a request receiving step for receiving a request for delivery of service rendered to second information apparatuses. In response to the request received in the request receiving step, the data processing method offers a computing resource in the computing resource offering step.

The third aspect of the present invention may be modified to be a program for executing the method further comprising a request receiving step for receiving a request for delivery of services rendered to the second information apparatuses. In response to the request received in the request receiving step, the data processing program enables a corresponding computer unit to execute the data processing method for offering a computing resource in the computing resource offering step.

The fourth aspect of the present invention may be modified to be a recording medium having recorded therein the data processing program for executing the method further comprising: a request receiving step for receiving a request for delivery of a service rendered to the second information apparatuses. The recording medium is recorded with the data processing program for enabling a corresponding computer unit to execute the data processing method for offering a computing resource to the second information apparatuses in the computing resource offering step in response to the request received in the request receiving step.

The first aspect of the present invention may further be modified to comprise communicating means for communicating variation of a physical condition of the second information apparatus and a request from the second information apparatus at least by way of utilizing first data indicating a computing resource of the second information apparatus, second data indicating a statistic result of access by the second information apparatus to the first information apparatus, and third data indicating the physical condition of the second information apparatus. The data processing apparatus makes it possible to control computing resources based on the result of communication via the communicating means.

The second aspect of the present invention may be modified to further comprise a communicating step for communicating variation of a physical condition of the second information apparatus and a request from the second information apparatus at least by way of utilizing first data indicating a computing resource of the second information apparatus, second data indicating a statistic result of access by the second information apparatus to the first information apparatus, and third data indicating the physical condition of the second information apparatus. According to the data processing method, it is possible to control computing resources based on the communication in the communicating step.

The third aspect of the present invention may be further modified to be a data processing program for executing the method further comprising a communicating step for communicating variation of a physical condition of the second information apparatus and a request from the second information apparatus at least by way of utilizing first data indicating a computing resource of the second information apparatus, second data indicating a statistic result of access by the second information apparatus to the first information apparatus, and third data indicating the physical condition of the second information apparatus. According to the program, it is possible to control computing resources based on the communication in the communicating step.

The fourth aspect of the present invention may be further modified to be a recording medium having recorded therein the data processing program for executing the method further comprising a communicating step for communicating variation of a physical condition of the second information apparatus and a request from the second information apparatus at least by way of utilizing first data indicating a computing resource of the second information apparatus, second data indicating a statistic result of access by the second information apparatus to the first information apparatus, and third data indicating the physical condition of the second information apparatus. According to the recording medium, it is possible to properly control computing resources based on the communication in the communicating step.

According to a fifth aspect of the present invention, there is provided a data processing apparatus capable of effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing apparatus according the fifth aspect of the present invention comprises a first layer comprising a system element supporting an application software of the second information apparatus connected via the network and a second layer comprising a system element controlling all computer resource of the network and being constructed separately from the first layer. The computer resource is offered to the second information apparatus in accordance with a control by the second layer.

A sixth aspect of the present invention provides a data processing program for enabling a computer unit to execute a function of a data processing apparatus capable of effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing program according the sixth aspect of the present invention enables the computer unit to execute a function of the data processing apparatus which comprises a first layer comprising a system element supporting an application software of the second information apparatus connected via the network and a second layer comprising a system element controlling all computer resource of the network and being constructed separately from the first layer. The computer resource is offered to the second information apparatus in accordance with a control by the second layer.

A seventh aspect of the present invention provides a recording medium having recorded therein a data processing program for enabling a computer unit to execute a function of a data processing apparatus capable of effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. In the recording medium according the seventh aspect of the present invention, there is recorded a data processing program which enables the computer unit to execute a function of the data processing apparatus which comprises a first layer comprising a system element supporting an application software of the second information apparatus connected via the network and a second layer comprising a system element controlling all computer resource of the network and being constructed separately from the first layer. The computer resource is offered to the second information apparatus in accordance with a control by the second layer.

An eighth aspect of the present invention provides a data processing system for effectively utilizing computing resources. The data processing system comprises one or more servers, one or more client apparatuses and a network. Each of the servers is an information apparatus having a computing resource enough to allow others to use in addition to own use. Each of the client apparatuses is an information apparatus merely having a computing resources just enough to sustain own use. The network is formed to have a limited operating range and comprises the server and the client apparatus mixedly connected. In the data processing system, the server allows the client apparatus to use the computing resource of the server in response to a request from the client apparatus.

The eighth aspect of the present invention may be modified to be the data processing system in which the client apparatus executes application software. In the data processing system, at least first data indicating a computing resource of the client apparatus, second data indicating a statistic result of access by the client apparatus to the server, and third data indicating a physical condition of the client apparatus are utilized to notify variation of the physical condition of the client apparatus and to send a request from the client apparatus via the network so as to control the computing resource.

According to a ninth aspect of the present invention, there is provided a data processing apparatus capable of effectively utilizing computing resources on a first network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing apparatus according the ninth aspect of the present invention comprises first connecting means, second connecting means, computing resource data acquisition means, downloading means and computing resource offering means. The first connecting means is for connecting to the first network formed to have the limited operating range. The second connecting means is for connecting to a second network outside the first network. The computing resource data acquisition means acquires data of a computing resource of the client apparatus connected to the first network. The downloading means downloads data in accordance with an instruction from the client apparatus via the second network. The computing resource offering means offers a computing resource to the client apparatus in accordance with the data of the computing resource of the client apparatus acquired by the data computing resource data acquisition means. In the data processing apparatus, the data downloaded by the downloading means is delivered to the computing resource offered by the computing resource offering means so that the computing source has already received the data when the client apparatus requests the data.

A tenth aspect of the present invention provides a data processing method for effectively utilizing computing resources on a first network formed to have a limited operating range. In the first network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method according the tenth aspect of the present invention comprises a first connecting step, a second connecting step, a computing resource data acquiring step, a downloading step and a computing resource offering step. The first connecting step is a step of connecting to the first network. The second connecting step is a step of connecting to a second network outside the first network. The computing resource data acquiring step is a step of acquiring data of a computing resource of the second information apparatus connected to the first network. The downloading step is a step of downloading data in accordance with an instruction from the second information apparatus via the second network. The computing resource offering step is a step of offering a computing resource to the second information apparatus in accordance with the data of the computing resource of the second information apparatus acquired in the computing resource data acquiring step. In the computing resource offering step, a computing resource is offered to the second information apparatus connected to the network. According to the method, the data downloaded by the downloading means is delivered to the computing resource offered by the computing resource offering means so that the computing resource has already received the data when the client apparatus requests the data.

An eleventh aspect of the present invention provides a data processing program for enabling a computer unit to execute a data processing method for effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method executed according the eleventh aspect of the present invention comprises a first connecting step, a second connecting step, a computing resource data acquiring step, a downloading step and a computing resource offering step. The first connecting step is a step of connecting to the first network. The second connecting step is a step of connecting to a second network outside the first network. The computing resource data acquiring step is a step of acquiring data of a computing resource of the second information apparatus connected to the first network. The downloading step is a step of downloading data in accordance with an instruction from the second information apparatus via the second network. The computing resource offering step is a step of offering a computing resource to the second information apparatus in accordance with the data of the computing resource of the second information apparatus acquired in the computing resource data acquiring step. In the computing resource offering step, a computing resource is offered to the second information apparatus connected to the network. According to the method, the data downloaded by the downloading means is delivered to the computing resource offered by the computing resource offering means so that the computing resource has already received the data when the client apparatus requests the data.

An twelfth aspect of the present invention provides a recording medium having recorded therein a data processing program for enabling a computer unit to execute a data processing method for effectively utilizing computing resources on a network formed to have a limited operating range. In the network, one or more first information apparatuses and one or more second information apparatuses are mixedly connected. Each of the first information apparatuses has a computing resource enough to allow others to use in addition to own use. Each of the second information apparatuses merely has a computing resources just enough to sustain own use. The data processing method executed in the program recorded in the recording medium according the twelfth aspect of the present invention comprises a first connecting step, a second connecting step, a computing resource data acquiring step, a downloading step and a computing resource offering step. The first connecting step is a step of connecting to the first network. The second connecting step is a step of connecting to a second network outside the first network. The computing resource data acquiring step is a step of acquiring data of a computing resource of the second information apparatus connected to the first network. The downloading step is a step of downloading data in accordance with an instruction from the second information apparatus via the second network. The computing resource offering step is a step of offering a computing resource to the second information apparatus in accordance with the data of the computing resource of the second information apparatus acquired in the computing resource data acquiring step. In the computing resource offering step, a computing resource is offered to the second information apparatus connected to the network. According to the method, the data downloaded by the downloading means is delivered to the computing resource offered by the computing resource offering means so that the computing resource has already received the data when the client apparatus requests the data.

The ninth aspect of the present invention may be modified to be the data processing apparatus having information acquisition means instead of the computing resource data acquisition means. The information acquisition means acquires information of all the second information apparatuses connected to the first network. The modified data processing apparatus determines whether or not the second information apparatus that instructs downloading of the data is adaptable to the data in response to the data acquired by the information acquisition means. If the data processing apparatus determines that the second information apparatus is not adaptable to the data, a list of all the second information apparatus adaptable to the data is made in accordance with the acquired data so that the data downloaded by the downloading means is delivered to a computing resource offered to the second information apparatus selected from the list.

The tenth aspect of the present invention may be modified to be the data processing method having an information acquiring step instead of the computing resource data acquiring step. The information acquiring step is a step of acquiring information of all the second information apparatuses connected to the first network. According to the modified data processing method, it is determined whether or not the second information apparatus that instructs downloading of the data is adaptable to the data in response to the data acquired by the information acquisition means. If the second information apparatus is determined to be not adaptable to the data, a list of all the second information apparatus adaptable to the data is made in accordance with the acquired data so that the data downloaded by the downloading means is delivered to a computing resource offered to the second information apparatus selected from the list.

The eleventh aspect of the present invention may be modified to be the program for executing the method comprising an information acquiring step instead of the computing resource data acquiring step. The information acquiring step is a step of acquiring information of all the second information apparatuses connected to the first network. According to the modified data processing method, it is determined whether or not the second information apparatus that instructs downloading of the data is adaptable to the data in response to the data acquired by the information acquisition means. If the second information apparatus is determined to be not adaptable to the data, a list of all the second information apparatus adaptable to the data is made in accordance with the acquired data so that the data downloaded by the downloading means is delivered to a computing resource offered to the second information apparatus selected from the list.

The twelfth aspect of the present invention may be modified to be a recording medium having recorded therein the data processing program for enabling a computer unit to execute the data processing method comprising an information acquiring step instead of the computing resource data acquiring step. The information acquiring step is a step of acquiring information of all the second information apparatuses connected to the first network. According to the modified data processing method, it is determined whether or not the second information apparatus that instructs downloading of the data is adaptable to the data in response to the data acquired by the information acquisition means. If the second information apparatus is determined to be not adaptable to the data, a list of all the second information apparatus adaptable to the data is made in accordance with the acquired data so that the data downloaded by the downloading means is delivered to a computing resource offered to the second information apparatus selected from the list.

As described above, according to the first to the fourth aspect of the present invention, the computing resource is offered to the second information apparatus connected to the network formed to have the limited operating range. If the physical condition of the second information apparatus is determined to be not connected to the network in accordance with the notice, the service to be offered to the second information apparatus is provided to the computing resource offered to the second information apparatus. By virtue of this arrangement, independently of an actual connection condition of the second information apparatus to the network, the service to the second information apparatus can be continuously provided.

According to modifications of the first to fourth aspects described above, since the computing resource is offered to the second information apparatus in response to the request from the second information apparatus for the service provided to the second information apparatus, it is possible to provide a dynamically adaptable service to the second information apparatus.

According to the other modifications of the first to fourth aspects described above, since the computing resource is controlled in response to the data on the variation of the physical condition of the second information apparatus and the request from the second information apparatus communicated at least by way of utilizing the first data indicating the computing resource of the second information apparatus, the second data indicating the statistic result of the access by the second information apparatus to the first information apparatus, and third data indicating the physical condition of the second information apparatus, it is possible to properly control computing resources all the time dynamically adapting to an actual condition of the second information apparatus.

According to the fifth to seventh aspect of the present invention, since the computing resource is offered in response to the control of the second layer, resource control operation can be carried out independently of the operation of the application run on the second information apparatus.

According to the eighth aspect of the present invention, since the first information apparatus offers its computing resource to the second information apparatus in response to the request from the second information apparatus, it is possible to efficiently utilize computing resources of the entire.

According to the modification of the eighth aspect of the invention, since the computing resource is controlled in response to the data on the variation of the physical condition of the second information apparatus and the request from the second information apparatus communicated at least by way of utilizing the first data indicating the computing resource of the second information apparatus, the second data indicating the statistic result of the access by the second information apparatus to the first information apparatus, and third data indicating the physical condition of the second information apparatus, it is possible to properly control computing resources all the time dynamically adapting to an actual condition of the second information apparatus.

According to the ninth to twelfth aspect of the present invention, since the downloaded data is delivered to the computing resource offered to the second information apparatus so that the computing resource has already received the data when the client apparatus requests the data, the second information apparatus can acquire desired data within a short period of time.

According to the modification of the ninth to twelfth aspects of the present invention, since the downloaded data is delivered to the computing resource offered to the second information apparatus which is adaptable to the downloaded data if the second information apparatus which requested to download the data is not adaptable to the data, it is possible to assign the data downloaded in response to the request from the apparatus not adaptable to the data to the other apparatus adaptable to the data.

According to the present invention, in such a private server middleware operating itself on an operating system OS, the inventive private server comprises a system by way of discretely forming the application modules and the control layer modules. Because of this arrangement, communication utilized by the application programs of client apparatuses are not adversely affected by communication utilized for controlling computing resources. As a result, such operation for controlling computing resources can be performed independently of the operation of the application programs of the client apparatuses. Accordingly, when introducing the inventive system, there is an advantage of dispensing with correction and change of basic software such as the operating system of the private server.

According to the present invention, there is an advantage that computing resources including the CPU, a memory, and hard disk area, respectively existing on the domestic network that can more effectually be utilized.

DESCRIPTION OF THE PREFERRED EMBODIMENTS

Referring now to the accompanying drawings, an embodiment of the present invention is described below.

Figure 1:
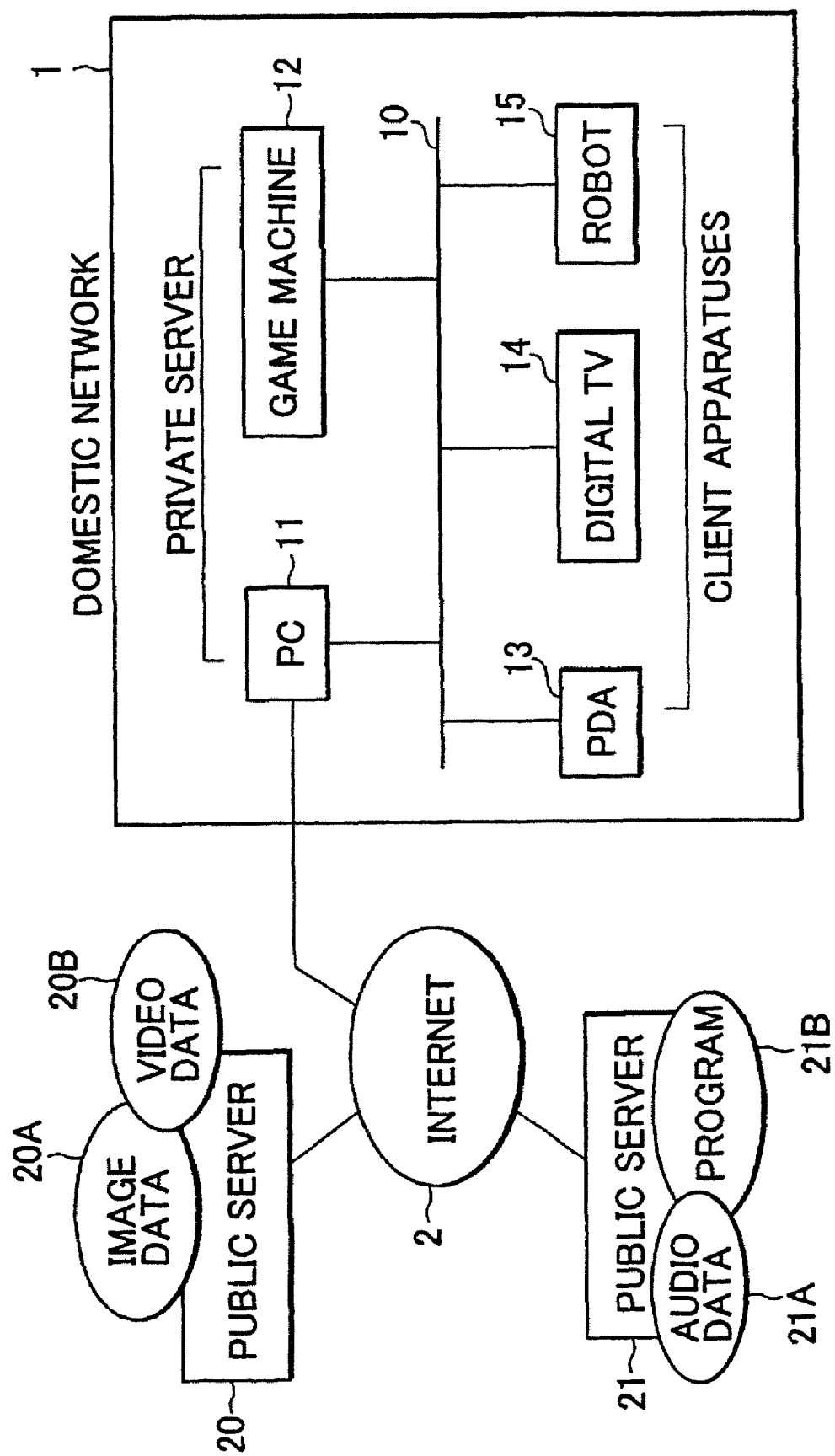
FIG. 1 is a schematic diagram showing an example of a domestic network system to which the present invention can be applied.

FIG. 1 shows an example of a domestic network system to which the present invention can be applied. In a domestic network 1, a plurality of private servers being first information apparatuses, and a plurality of client apparatuses being second information apparatuses are individually connected to a network 10. The network 10 may be constructed by means of Ethernet or IEEE1394, for example.

Each of the private servers corresponds to a domestic "resource-abundant apparatus", which is capable of carrying out a computing resource offering service according to the present invention. For example, a personal computer (PC) 11 or a high performance home game machine 12 may be utilized to serve as the private server. Further, it is also practicable to utilize a home information appliance such as a VCR having a large-capacity hard disk or the like. Aside from the own use, the above private server further contains another computing resource that can be offered to the others. The domestic network 1 includes at least one unit of the private.

Each of the private servers is connected to an external network 2 via a telephone circuit, a leased circuit, a satellite broadcasting circuit, a cable for a cable television set or the like. Hereinafter, the external network 2 is referred to as the Internet 2. Servers 20 and 21 which are linked with the Internet 2 and which supply data and programs to the private servers are referred to as public servers 20 and 21 in the following description. In the example shown in FIG. 1, the personal computer 11 serving as a private server is connected to the Internet 2. Any of the private servers is capable of downloading data and programs from the public servers 20 and 21 via the Internet 2.

On the other hand, any of the client apparatuses corresponds to such a "resource-scarcity apparatus" which is allowed to use offered computing resource. Such a PDA 13, a portable telephone, a digital TV 14 having little hard disk capacity available, and a robot apparatus 15, may respectively correspond to the client apparatus. Many of the client apparatuses merely contain a computing resource just enough to sustain its own use. In the present invention, each of the client apparatuses is capable of downloading image data, audio data, video data, and programs from the public servers 20 and 21 linked with the private servers via the Internet 2 by way of utilizing a computing resource offered by the private servers. Further, each of the client apparatuses can execute programs by way of utilizing the computing resource offered by the private servers.

If a computing resource is a hard disk area of the private server, offering of the computing resource is carried out in such a way that a predetermined area of the hard disk area is offered to a client apparatus. Further, if a computing resource is the CPU capacity, offering of the computing resource is carried out in such a way that a slot obtained by a predetermined time division of processing capacity of the CPU is allocated to a certain client apparatus. Further, it is also possible to execute a certain process against a client apparatus while the personal computer 11 remains idle.

For explanatory convenience, FIG. 1 exemplifies such a case in which the public server 20 supplies image data 20A and video data 20B, whereas the public server 21 supplies audio data 21A and a program 21B. Not only the illustrated example, but also it is possible to supply a wide variety of data via a number of public servers linked with the Internet 2.

Figure 2:
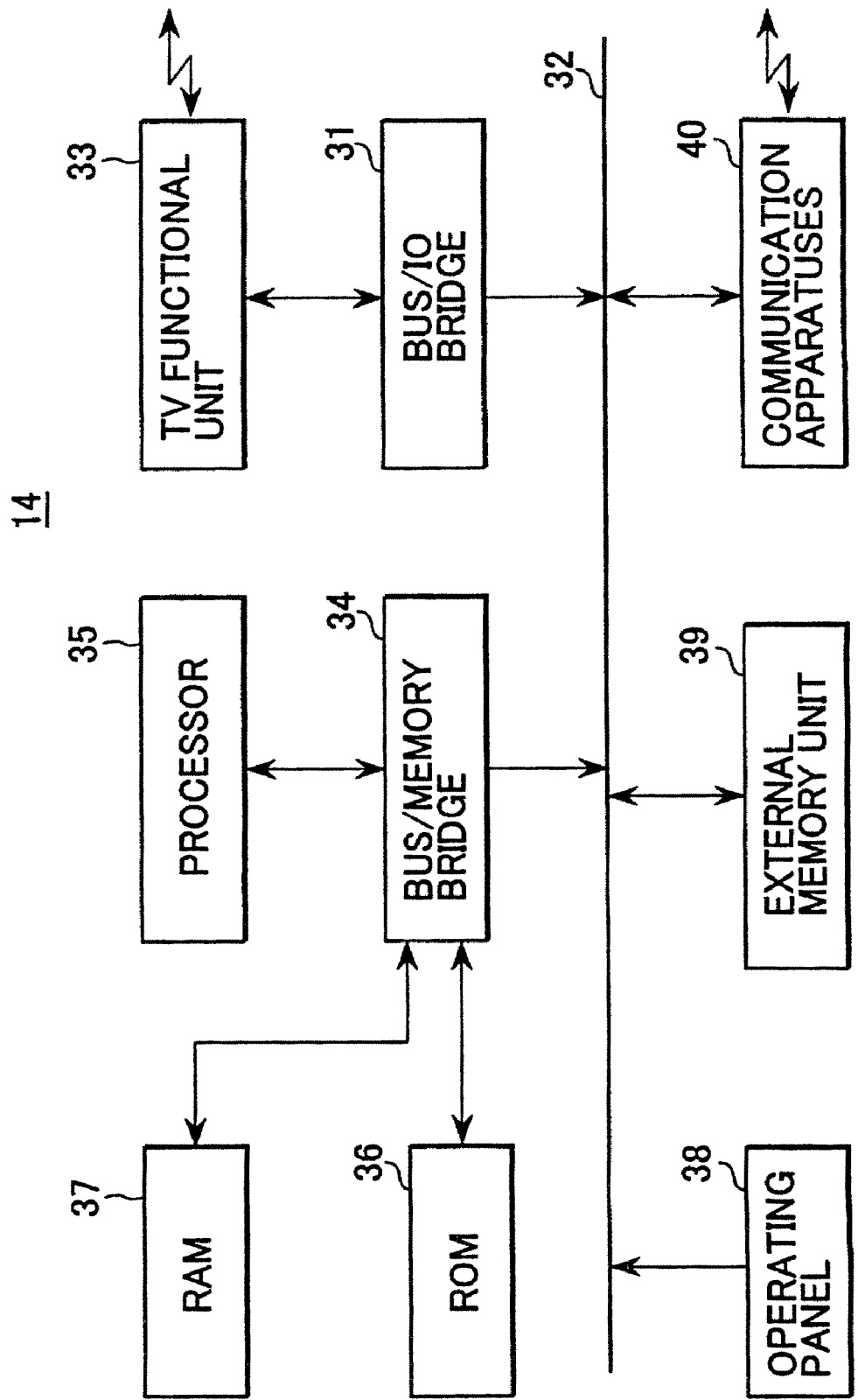
FIG. 2 is a schematic block diagram showing an example of a digital TV, one of apparatuses to be connected to the domestic network.

Next, constructions of individual apparatuses connected to the domestic network 1 shown in FIG. 1 are described below. FIG. 2 schematically exemplifies a digital TV 14, one of apparatuses to be connected to the domestic network system. FIG. 2 specifically exemplifies those portions related to network connection and computing resources in the construction of the digital TV 14.

Based on video and audio signals received from a selected broadcast station via an antenna or a cable, a video image is displayed on an image display such as a CRT (Cathode Ray Tube) or an LCD (Liquid Crystal Display) with output of sound via speakers. Not only such conventional TV function, but also the digital TV 14 is capable of receiving programs and data via an external source by applying a communication unit 40.

A TV functional unit 33 reproduces video and audio data based on the video and audio signals received via the antenna or the cable. The TV functional unit 33 is connected to a bus 32 via a bus/IO bridge 31, whereby making it possible to exchange signals between the TV functional unit 33 and other portions.

In order to control individual operating units of the digital TV 14, a processor 35 is connected to the bus 32 via a bus/memory bridge 34. A random access memory (RAM) 37 and a read only memory (ROM) 36 are connected to the processor 35 via the bus/memory bridge 34. The ROM 36 previously stores an operating system (OS) for allowing the processor 35 to controlling the digital TV. The RAM 37 is utilized as a working area of the processor 35. Using the RAM 37 as working area, the operating system and an application program stored in the ROM 36 are individually executed by the processor 35 so as to properly control every operating unit of the digital TV 14.

Further, an operating panel 38, an external memory unit 39, and the communication unit 40 are connected to the bus 32. Based on the control executed by the processor 35, the communication unit 40 functions as a communication interface to control communication with the network 10. In a case of utilizing the digital TV 14 as a private server, the digital TV 14 may also be connected to the Internet 2 via the communication unit 40.

The above external memory unit 39 consists of a hard disk drive unit or the like. Image and audio data received and reproduced via the TV functional unit 33 are individually fed to the external memory unit 39 via the bus/IO bridge 31 and the bus 32 to be stored therein. Further, the image data, audio data and programs downloaded from an external source such as the Internet 2 via the communication unit 40 are also stored in the external memory unit 39. Not only those data cited above, but also, in order to control the digital TV 14, it is possible to store the operating system and the application software for controlling the digital TV 14 in the external memory 39.

The operating panel 38 is provided with one or a plurality of switches and dials. By way of operating these switches or dials via user's manual operation, a control signal is output. Based on the control signal output, the processor 35 controls every operating unit of the digital TV 14.

Note that FIG. 1 exemplifies the digital TV 14 as one of the client apparatuses. However, by way of introducing a large-capacity external memory unit 39 or introducing a processor 35 with more sophisticated computing power, it is also possible to utilize the digital TV 14 as a private server.

The above description has specifically referred to the digital TV 14. Likewise, it should be supposed that the other apparatuses linked with the domestic network 1 are individually provided with a processor, a ROM, a RAM, and such operating units equivalent to the above-explained digital TV 14 except for the TV functional unit 33. In other words, it should be supposed that each of the private server and client apparatuses contains a specific computing power to enable basic software such as an OS and application programs to be executed. It should also be supposed that each of the private server and client apparatuses can be linked with the network as well.

Figure 3:
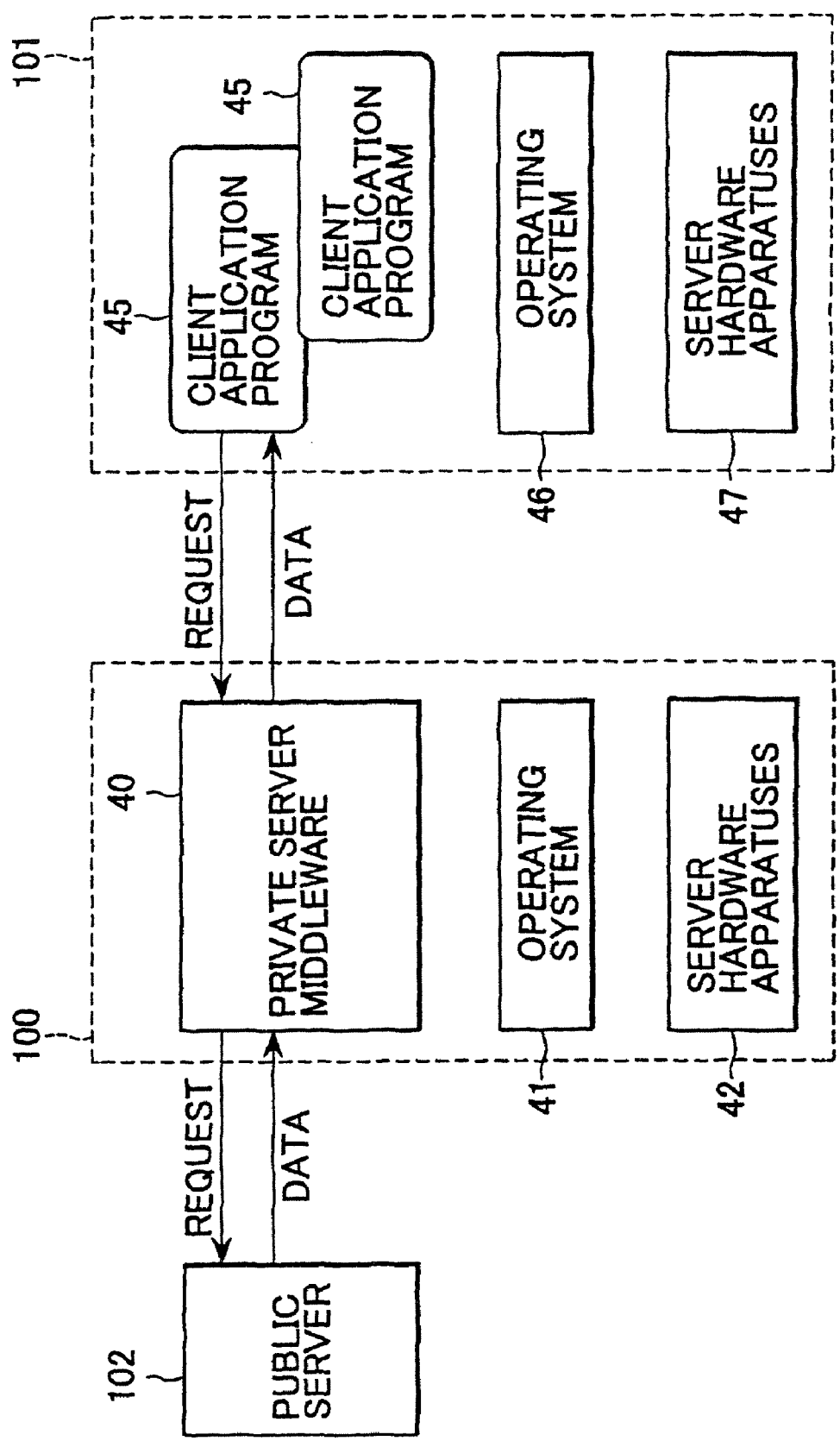
FIG. 3 is a schematic diagram showing an example of software that is applied to the present invention.

Referring now to FIG. 3, construction of software applied to the present invention is described below. The software for constructing the domestic network 1 according to an embodiment of the present invention comprises the software on the part of a private server 100 and the other software on the part of a client apparatus 101.

As shown in FIG. 3, in the private server 100, middleware 40 is formed on an operating system (OS) 40. Server hardware 42 for constituting a main unit of the private server 100 is controlled by the OS 41. The middleware 40 used for the private server 100 is referred to as private server middleware 40 in the following description.

For example, after being recorded in a recording medium such as a CD-ROM readable by the private server 100, the private server middle ware 40 is installed in a predetermined location of the private server 100 to enable its execution. Not only this method, but also the middleware 40 may be supplied from the Internet 2.

On the other hand, individual application programs 45, 45, . . . applicable to the client apparatus 101 are constructed on OS 46 on the client apparatus 101 side. Further, client apparatus hardware 47 constituting the main unit of the client apparatus 101 is controlled by the OS 46. Such an application program applicable to the client apparatus 101 is referred to as the client application program 45 in the following description.

In the above system construction, in a case where the client application program 45 intends to acquire data from a public server 102 on the Internet 2, the client application program 45 generates a request to the public server 102 via the private server 100. Then, based on this request, desired data and programs are downloaded from the public server 102. The downloaded data and programs are then delivered to the client application program 45 via the private middleware 40. It is also possible to provisionally hold the downloaded data and programs on the private server 100.

The private server 100 monitors a communication history corresponding to the above processing period. Based on the monitored communication history, the private server 100 controls computing resources throughout the entire domestic network 1.

Software on the private server 100 side is constructed as the middleware 40 on the OS 41. Because of this, it is possible to place such portion related to this system in the client apparatus 101 on the middle ware 40 side, whereby making it possible to preserve high-degree transferability of software and recycled utilization of the existing application programs.

Figure 4:
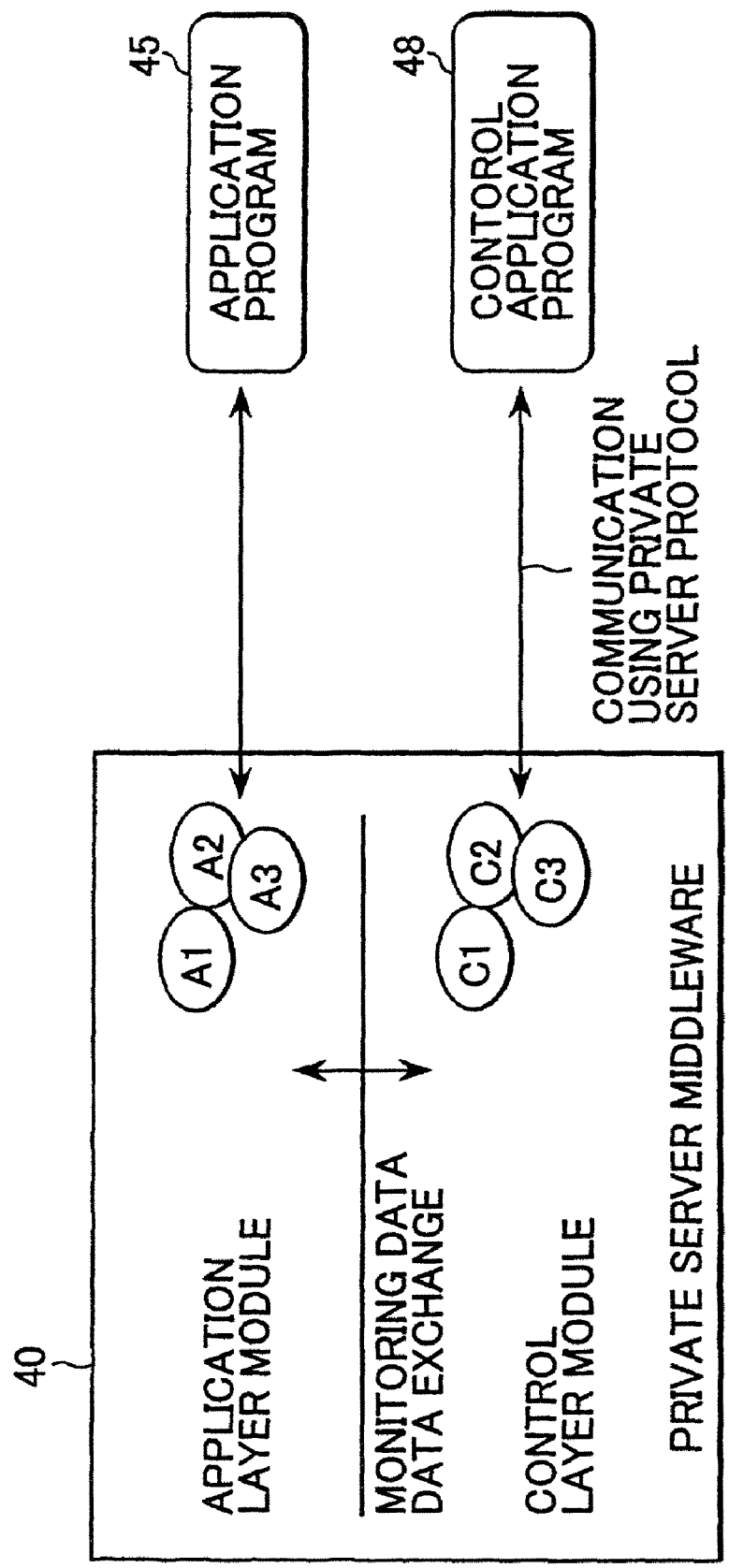
FIG. 4 is a schematic diagram showing a detailed construction of an example of a middle ware for a private server being a first information apparatus.

FIG. 4 exemplifies a further detailed construction of the private server middleware 40, which consists of groups of software modules called a plurality of "system constructing elements". The system constructing elements are classified into two groups including application layer modules and control layer modules individually operating themselves independent of each other.

FIG. 4 exemplifies the application layer modules A1, A2, and A3. These application layer modules individually support operation of the application programs 45, 45, . . . performed by the client apparatus 101 and yet relay communication between the client apparatus 101 and the public server 102. Concurrently, a specific software module for processing a communication protocol required for the application programs 45, 45, . . . is defined.

On the other hand, the control layer modules are designated as modules C1, C2, and C3, in FIG. 4. In order to properly control computing resources, these control layer modules individually perform controlling operation. Concretely, these control layer modules individually provide services for offering computing resources, and yet, also provide dynamic adaptability to deal with user's request and variation of physical condition of client apparatuses.

On the side of the client apparatus 101, by way of activating a control application program 48 as an interface, a user's request to the client apparatus 101 and physical variation of the client apparatus are reported to the private server 100. The control application program 48 is distinguished from other conventional application programs 45 used for the client apparatuses. By way of operating the control application program 48 and the control layer module of the private server 100, communication is carried out. Such protocol applied to this communication is called a private server protocol, which enables the request and data on the control of computing resources to be exchanged.

As described above, in the present embodiment, the application layer modules are disposed apart from the control layer modules in the private server middleware 40 on the private server 100. Because of this, the communication carried out by applying the application programs 45, 45, . . . on the client apparatus 101 remains unaffected by the communication performed for controlling computing resources. As a result, the computing resources controlling operation is performed independently of the operation of the application programs 45, 45, . . . on the client apparatus 101, whereby making it possible to perform the operation for properly controlling computing resources on the system without necessarily varying the existing application programs 45, 45, . . . .

In the private server middleware 40, as a part of the computing resources control operation, data can be exchanged between the application layer modules and the control layer modules. For example, a case of preparing a communication history listing names of those files requested by the client apparatus 101 to the public server 102 is conceived. The prepared communication history is transferred from the application layer modules to the control layer modules to enable the control layer modules to prepare and hold the communication history. As a result, it is possible for the user operating the client apparatus 101 to access the prepared communication history via the control layer modules by applying the control application program 48.

The private server 100 provides the client apparatus 101 with a service called "apparatus condition permeating service", which permeates physical variation of the client's apparatus 101. More particularly, according to the "apparatus condition permeating service", even when the client apparatus 101 is disconnected from the network 10 and then connected to each other again, the service is continuously preserved.

For example, the following service is conceived. Initially, names of data that may frequently be accessed by the client apparatus 101 in the future are registered in the private server 100. In advance of receiving a request from the client apparatus 101 for accessing the registered data, the private server 100 acquires the latest edition of the corresponding data, and then preserves the acquired data in a hard disk area offered to the client apparatus 101.

By way of activating the "apparatus condition permeating service", even when the client apparatus 101 remains disconnected from the network 10, it is possible to preserve the updated data that is to be accessed by the client apparatus 101 frequently. For example, while a user bearing a PDA 13 is out of his home, it is possible to provide the service to have the updated data usable for the PDA 13 downloaded into a personal computer 11 operating itself as the private server 100. In other words, by way of utilizing the "apparatus condition permeating service", it is possible to efficiently utilize computing resources in the domestic network 1.

Further details of the application layer modules are described below. By way of utilizing the application layer modules, it is possible to support execution of the application programs 45, 45, . . . on the client apparatus 101, whereby enabling the control program to collect statistic data for proper control of computing resources.

As one of the application layer modules, "protocol handler" is defined. The protocol handler is defined common functions related to communication protocol in the course of executing the application programs 45, 45 as system constructing elements. For example, the world wide web (WWW) application program for viewing such information open to public on the Internet 2 is communicated by applying the Hyper-Text Transfer Protocol (http). In a case of operating the application programs 45, 45, . . . on the client apparatus 101, the http protocol handler is defined in the private server 100. In the same way, when the application programs 45, 45, . . . are operated in accordance with the "Home Audio Video Interoperability (HAVI)" specification for controlling home-use audio and video apparatuses, the HAVI protocol handler is defined in the private server 100.

Figure 5:
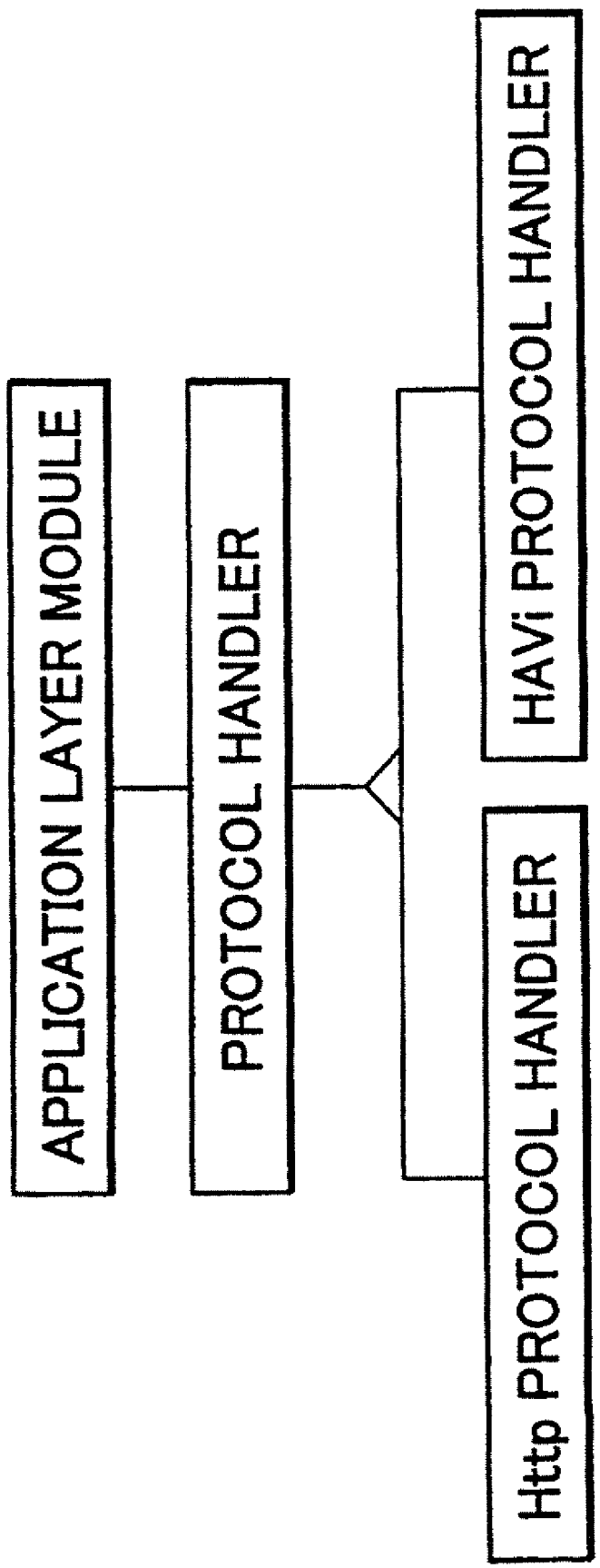
FIG. 5 is an OMT (object modeling technique) diagram showing an example of a module related to an application layer module.

FIG. 5 exemplifies an object modeling technique (OMT) diagram related to the application layer modules. Generally, selection of a specific communication module depends on practical use of a specific protocol suitable for communication on the client apparatus 101. Because of this, it is desired that the usable protocol handler be easily added, or deleted, or replaced with another one. To implement this, a system for succeeding the "object-oriented technique" has been introduced. In other words, by way of unifying specification of the protocol handler, it is so arranged that a newly added protocol handler can readily be replaced with another one.

In FIG. 5, the application layer module accesses a plurality of protocol handlers including the "http" protocol handler and the "HAVI" protocol handler, each having own specification. Because of this, those protocol handlers based on the specification lower than that of the exemplified protocol can easily be added and replaced with another one.

Main portions of the interface common to protocol handlers are exemplified below.

```
Interface Protocol Handler
{
    getData (String filename, Any parameters) ;
}
```

The term "getData( )" designates an interface for accepting a request from the client apparatus 101 for acquisition of data. As "fileName", names of data to be acquired is input. The term "parameters" designates data added to the request for acquisition, in which a plurality of data can be described.

Figure 6:
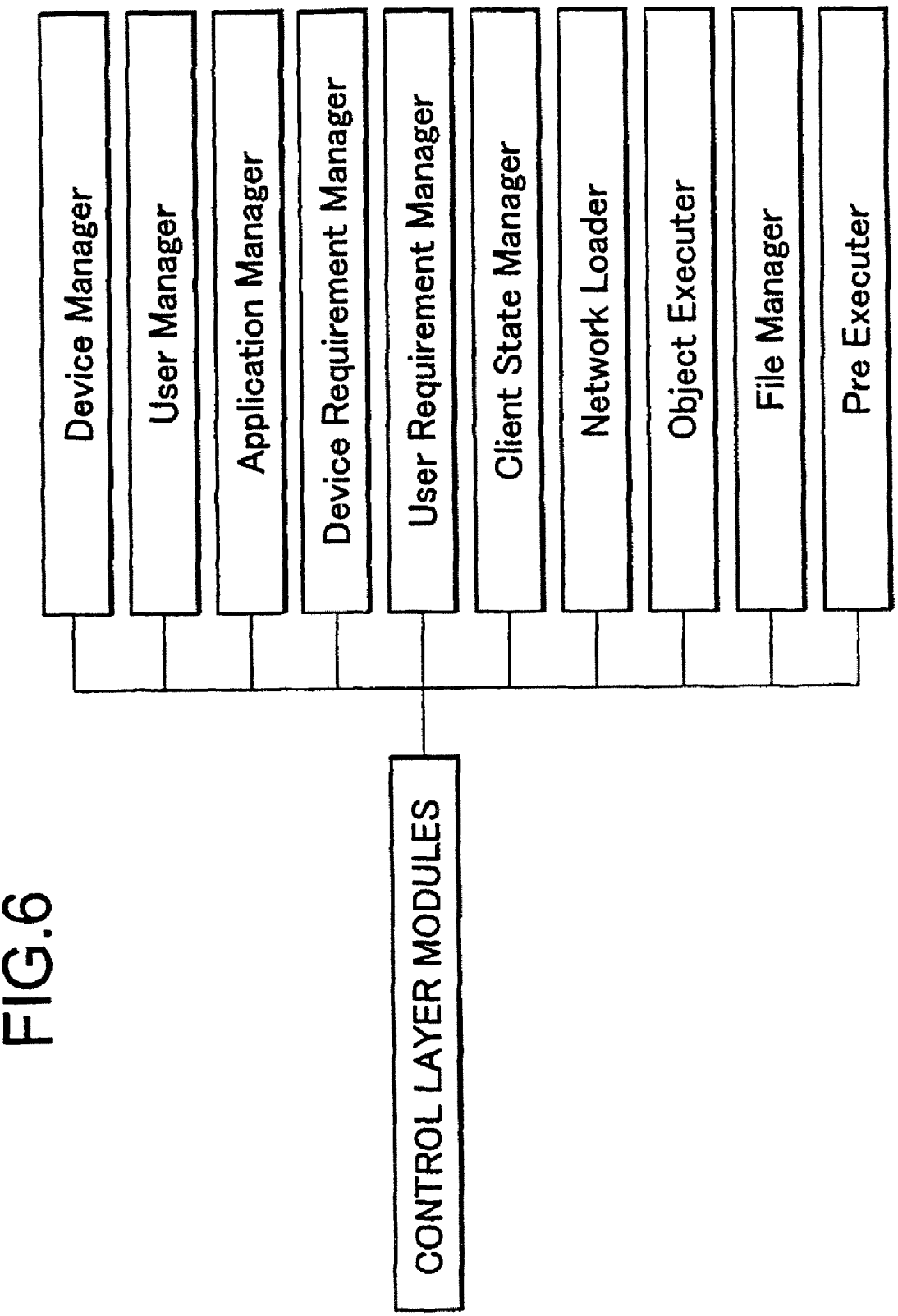
FIG. 6 is an OMT diagram showing an example of main control layer modules.

Further details of the control layer modules are described below. Each of the control layer modules contains a function for rendering services for offering computing resources and another function to support dynamic adaptability performed by the user. FIG. 6 exemplifies an object modeling technique (OMT) diagram of the main control layer module.

By virtue of the "Device Manager" of the control layer module, information on the computing resources of the client apparatus 101 including data on an actual memory capacity, CPU performance, a display size and the like of the client apparatus 101 are respectively preserved. In addition, the "Device Manager" monitors communication by the client apparatuses 101.

An example of the main interfaces provided for the "Device Manager" is shown below. Structural elements usable as a parameter include the "deviceInfo", "userInfo", and "applicationInfo", which individually preserve data on the computing resources pertaining to the client apparatuses 101, users, and application programs 45, 45.

```
Interface DeviceManager
{
    addDevice(Deviceinfo   dinfo);
    removeDevice(Deviceinfo   dinfo);
    monitorClient(List filenames);
    getDeviceStatistics((DeviceID id); and
    getDeviceNames(Condition    condition);
}
```

In the "DeviceManager", the "addDevice( )" notifies the private server 100 of an act in which a client apparatus 101 has been added to the domestic network 1. The "removeDevice( )" notifies the private server 100 of an act in which a client apparatus 101 has been deleted from the domestic network 1. The "monitorClient( )" notifies the private server 100 of the data on the result of monitoring communication by the client's apparatuses 101. The "getDeviceStatistics( )" notifies the private server 100 of a request from a client apparatus 101 for the reference related to statistic data such as a communication history of the corresponding client apparatus 101 itself. The "getDeviceNames( )" causes a list of the client apparatuses linked with the domestic network 1 to be returned to the private server 100. When the "getDeviceNames( )" is operated, the "condition" causes a condition representing own characteristics of the client apparatuses 101 is delivered to the private server 100. When the designated condition has been delivered, only the client apparatuses 101 exactly matching the designated condition are included in the list.

The "UserManager" of the control layer module controls user's statistic data including a history of data accessed the corresponding user and the user's profile data including taste of the user himself/herself.

An example of the main interfaces provided for the "UserManager" is shown below.

```
Interface UserManager
{
    addUser(UserInfo uinfo);
    removeUser(UserInfor uinfo);
    handleRequirement(UserProfile profile, Function procedure);
    getUserStatistics(Condition    condition);
}
```

In the "UserManager", the "addUser( )" notifies the private server 100 of an act in which a new user has joined the domestic network 1. The "removeUser( )" notifies the private server 100 of an act in which one of users has withdrawn himself/herself from the domestic network 1. The "handleRequirement( )" notifies the private server 100 of a user's request from a client apparatus 101. The "getUser Statistics( )" notifies the private server 100 of the request from the client apparatus 101 for the reference to statistic data including a communication history related to a user. The term "profile" designates user's profile data, whereas the term "procedure" designates a procedure for processing the user's request.

The "ApplicationManager" of the control layer module properly controls data on the application programs 45, 45, . . . to be executed against the client apparatuses 101, more particularly, it properly controls data on a computing resource requirement including a consumable amount of memory for the application programs 45, 45.

The "DeviceRequirementManager" of the control layer module properly controls items to be demanded per client apparatus 101.

The "UserRequirementManager" of the control layer module properly controls the requests from the users.

The "ClientStateManager" of the control layer module properly controls a physical condition of client apparatuses 101. An example of the main interfaces of the "ClientStateManager" is shown below.

```
Interface ClientStateManager
{
    ChangeState(ClientID id, State newState, Any parameters);
}
```

When the "ClientStateManager" is operated, the "changeState( )" notifies the private server 100 of the variation of an actual condition of a specific client apparatus 101. Small character "d" designates an identifier of the client apparatus 101. The term "newState" designates a physical condition of a new client apparatus 101. The term "parameter" designates data to be delivered from the client apparatuses 101 to the private server 100.

The "NetworkLoader" of the control layer module provides a system for accessing the domestic network 1, whereby making it possible to download data and programs via the domestic network 1.

The "ObjectExecuter" of the control layer module controls the CPU and memory of the private server 100, and accesses a system for executing programs.

The "FileManager" of the control layer module controls a hard disk area of the private server 100 and a hard disk area offered to each of the client apparatuses 101.

The "PreExecuter" of the control layer module provides the client apparatus 101 with "apparatus condition permeating service".

Next, the private server protocol and the dynamic adaptable system are described below. As described earlier, the private server protocol is utilized as the communication protocol for executing such communication between the control layer module on the private server 100 and the control application program 48 on the client's apparatus 101.

Request messages utilized by the private server protocol are classified into two kinds. A first request message consists of a message for reporting variation of a physical condition of the client apparatus 101 to the private server 100. A second message consists of a user's request message for transmitting a user's request from the client apparatus 101 to the private server 100.

First, a client apparatus condition controlling message corresponding to the first message is described below. In response to the client apparatus condition controlling message received by the private server 100, a dynamic adaptable operation is activated by the private server 100 to deal with variation of a physical condition of the client apparatus 101.

Figure 7:
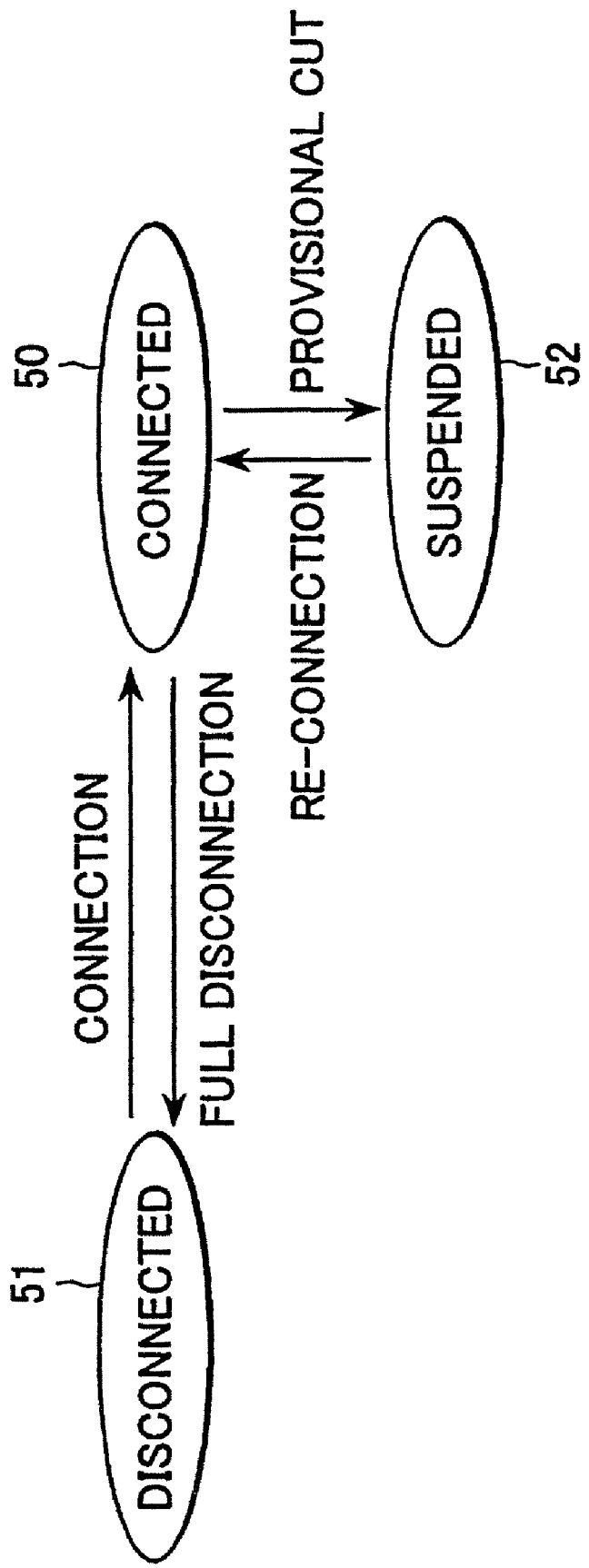
FIG. 7 is a schematic diagram illustrating transition of a physical condition of a second information apparatus (client apparatus)

FIG. 7 schematically designates transition of a physical condition of the client apparatus 101. The "connected condition 50" designates a state in which the client apparatus 101 receives a service from the private server 100 via the domestic network 1. The "disconnected condition 52" designates a state in which the client apparatus 101 is totally disconnected from the domestic network 1. While the "disconnected condition 51" remains, the private server 100 suspends to render service to the client apparatus 101.

The "suspended condition 52" designates such a state in which the client apparatus 101 is provisionally disconnected from the domestic network 1. Even after shifting the state from the "connected condition 50" to the "suspended condition 52", the private server 100 still continues to render service to the client apparatus 101. While the "suspended condition 52" still remains, the client apparatus 101 is in a state to be connected to the domestic network 1 over again within a short period of time. Accordingly, generally speaking, the private server 100 continues to render service to the client apparatus 101.

For example, when the private server 100 performs the above "apparatus condition permeating service" so as to acquire a file that may possibly be downloaded by the client apparatus 101, an operation to acquire the corresponding file is still continued even when the client apparatus 101 remains in the "suspended condition 52". On the other hand, when the state is shifted from the "connected condition 50" to the "disconnected condition 51", provision of the above "apparatus condition permeating service" is suspended.

In order to transmit the shift of the above operating conditions to the private server 100, a "client's apparatus condition controlling message" is utilized. This message is utilized by the control application program 48 on the client apparatus 101 in order to call the above-referred interface "changeState( )" of the "ClientStateManager" constituting one of the control layer modules provided for the private server 100. Then, the interface "changeState( )" notifies the private server 100 of the transition of the inoperative condition of the client apparatus 101. In this way, the private server 100 is notified of the distinction of the shift of the client apparatus 101 into the "suspended condition 52" or the "disconnected condition 51" after disconnection of the client apparatus 101 from the domestic network 1.

The module "ClientStateManager" controls the system operation when the client apparatus 101 shifts its operating condition. For example, when the client apparatus 101 shifts itself into the "suspended condition 52", the control layer module judges whether the service rendered by the private server 100 should be continued or not. In a case of rendering the "client's apparatus condition permeating service", this service is continuously provided. Concurrently, the module "ClientStateManager" calls a module "PreExecuter" defining the client apparatus condition permeating service to the client apparatus 101, whereby instructing to continuously render this service to the client apparatus 101.

Next, a user's request message corresponding to the second requesting message is described below. Based on the user's request message, the private server 100 dynamically responds to the user's request generated in the client apparatus 101. It is possible for the private server 100 to provide the client apparatus 101 with information related to communication between system devices and networks acquired in the course of operating the data processing system. Further, it is also possible to feed back such a request from user for delivery of the above information to allow the private server 100 to execute the request.

User's request processing messages are classified into two kinds. The first message enables the client apparatus 101 to acquire information on the computing resources collected and stored in the private server 100. When processing the first message, the client apparatus 101 utilizes such an interface called "getUserStatistics( )" belonging to a module called "UserManager" constituting a part of the above-referred control layer modules and the other interface "getDeviceStatistics( )" belonging to a module "DeviceManager" constituting a part of the control layer modules. By way of utilizing the above interfaces, the client apparatus 101 acquires the statistic data collected and stored in the private server 100, on the communication and execution of the communication.

The second message is utilized to feed a user's request for delivery of information transmitted from the private server 100 to the client apparatus 101 back to the private server 100. Concurrently, it is possible for the client apparatus 101 to feed the above data from user back to the private server 100 by way of utilizing an interface "handleRequirement( )" belonging to the module "UserManager" constituting a part of the above control layer modules. Each of user's requests is provided with a previously registered specific identifier in correspondence with the kind of the request, whereby enabling the above interface to precisely distinguish the contents of data being fed back.

For example, based on the identifier, it is possible to distinguish whether the received user's request pertains to a file to be loaded by user or an apparatus utilized by the user. It is possible for the above module "UserManager" to define the method of processing data on the user's request. It is also possible to selectively determine during transmission of data fed back from the user which one of the defined processing methods should be utilized. In the course of transmitting fed-back data, the above "handleRequirement( )" belonging to the above module "UserManager" on the private server 100 is called by the control application program 48 stored in the client apparatus 101.

Depending on the actual condition of the client apparatus 101, it is essential that processes during the "suspended condition 52" of the client apparatus 101 defined as the control layer module and the procedure for processing the above user's request be added or changed. For example, there is a client apparatus 101 that requests loading of data in advance while the "suspended condition 52" still remains or a client apparatus 101' which remains idle during the "suspended condition 52". Further, there is a case in which operation for feeding data from the client apparatus 101 back to the private server 100 may be executed merely by way of feeding back a list containing names of files. On the other hand, there is also a case in which a complicated operation may be required by way of specifying the processing period or processing method aside from names of files, for example.

Further, it is also required to add or change the control layer module in accordance with operating convenience of the client apparatus 101. Addition or change of the control layer module can be effected by way of introducing the above-referred object-oriented technique and defining a common interface as was done for the above referred application layer module. In this way, it is possible to preserve consistency in the procedure for adding or changing the control layer module, whereby making it possible to easily implement addition or change of the control layer module.

Next, the method of offering computing resources in the domestic network system according to an embodiment of the present invention is described in further details below. There are some of practically conceivable examples of applying the method of offering computing resources to an offering service rendered by the private server 100. An algorithm for effectuating offering of computing resources is described below by way of exemplifying (1) advanced-loading of image data based on a user's request and (2) assignment of audio data between individual client apparatuses.

First, referring to FIG. 3, a method of executing advanced loading of image data based on a user's request is described below. Initially, a list of image data downloaded from the public server 102 in the past via the client apparatus 101 is delivered to the client apparatus 101 from the private server 100. Next, a user of the client apparatus 101 selects image data supposed to be downloaded in the future from the list. The result of selection is transmitted as a feedback data from the client apparatus 101 to the private server 100. On receipt of the fed back data, the private server 100 loads the selected image data in advance.

By applying the module "DeviceManager" of the control layer module, the private server 100 acquires the previously loaded image data. Next, based on the data on the computing resources of the client apparatus 101, such processes required for the client apparatus 101 are executed. When dealing with a plurality of client apparatuses based on the data on the computing resources of the client apparatuses, processes compatible with individual client apparatuses 101 are executed.

The term "advanced loading" corresponds to an operation of loading a file in advance before the client apparatus 101 generates a request for loading the file.

For example, based on the data on the computing resources of the client apparatus 101, the private server 100 reduces or enlarges the size of a previously loaded picture image into a size corresponding to the display size. Concurrently, the downloaded picture image with the reduced or enlarged size is stored in a hard disk area offered to the corresponding client apparatus 101 by the private server 100. Inasmuch as a different hard disk area is offered to a different client apparatus 101, it is possible to enable a plurality of client apparatuses 101, 101, . . . each having a different display size to preserve the picture image each having a different size by applying an identical file name.

In a case where a client apparatus 101 deals with image data based on an image format exclusively available for the client apparatus, in order that image data compatible with this format can be prepared, in the course of downloading the image data, the private server 100 simultaneously downloads a conversion program. The downloaded conversion program is stored in a hard disk area offered to the corresponding client apparatus 101. Conversion of the picture image format based on the conversion program is executed by applying a CPU offered to the corresponding client apparatus 101.

Figure 8:
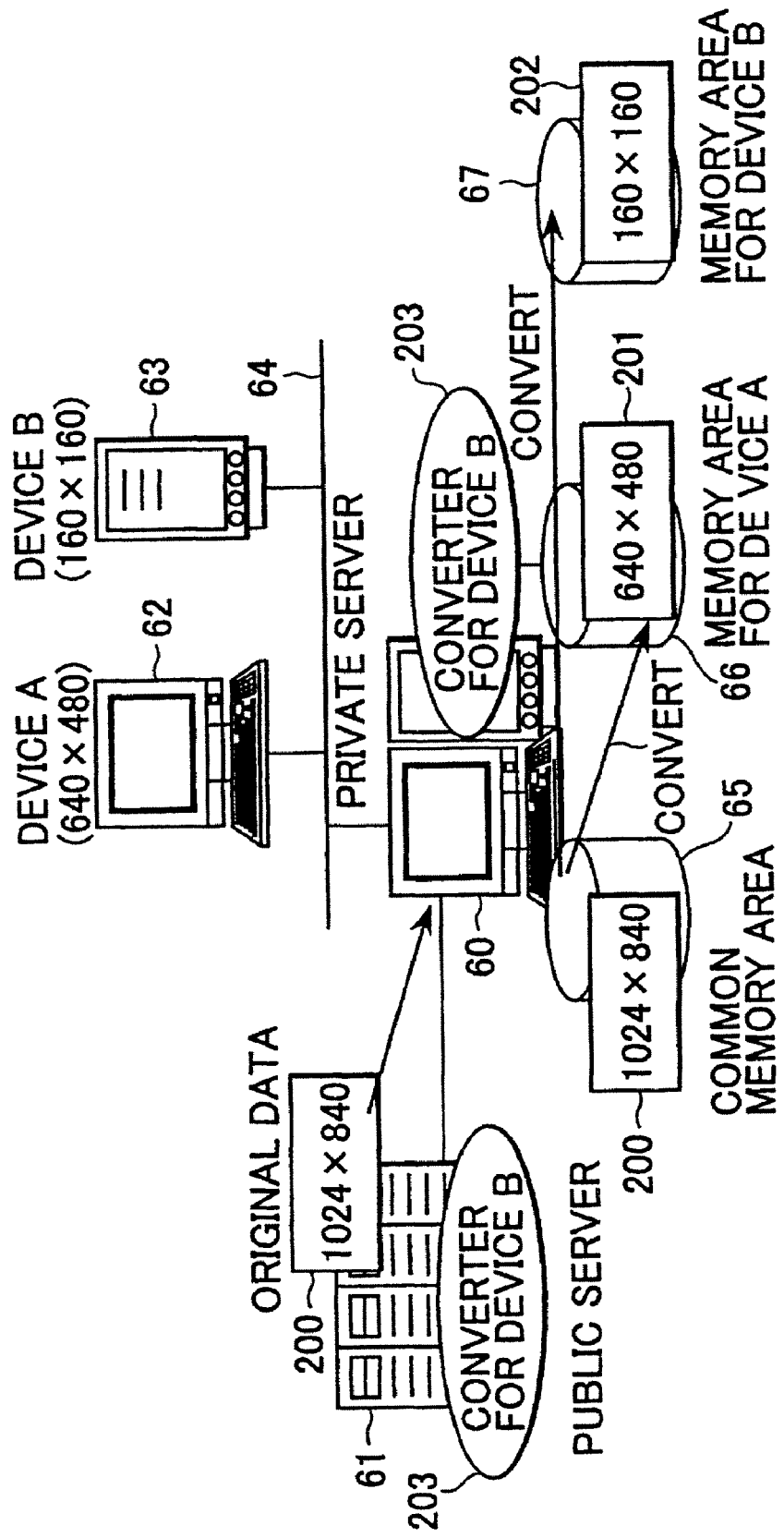
FIG. 8 is a schematic diagram illustrating an example of a process for advanced loading of image data in response to a user's request more specifically.

FIG. 8 exemplifies further detail of the system for downloading image data in advance based on the above-referred user's request. In FIG. 8, a pair of device A 62 and device B 63 are respectively connected to a network 64. Further, such a private server 60 consisting of a personal computer is also connected to the network 64. The private server 60 is further connected to the Internet, whereby enabling the private server 60 to communicate with a public server 61 on the Internet.

The private server 60 incorporates a memory device consisting of a hard disk unit, for example, where a part of the memory area is utilized as a common memory area 65. Among the whole memory area of the memory device, such a memory area 66 usable for a device A is offered to the device A 62, whereas such a memory area 67 usable for a device B is lent to the device B 63.

The device A is provided with 640×480 dots of display size, which makes it possible to display image data using a standard picture format. On the other hand, the device B is provided with 160×160 dots of display size for dealing with a specific image format.

In the above system construction, image data 200 with 1024×840 dots of display size is present on the public server 61. In this system, the device A 62 and the device B 63 respectively request the private server 60 to download the image data 200 in advance. The private server 60 is capable of dealing with the request from the device A 62 by way of converting the image data size. On the other hand, inasmuch as the device B 63 deals with a specific picture image format, it is also required to download a converter 203 corresponding to the above specific picture image format exclusively usable for the device B.

The private server 60 enables the public server 61 to download original image data 200, and yet, enables the converter 203 exclusively usable for the device B to be downloaded in advance. It is desired that the image data 200 and the converter 203 be of the updated one. For example, if there is data bearing a name identical to that of the already downloaded file, time stamps are compared to each other in order to identify whether the data to be downloaded now corresponds to the updated one or not. The downloaded image data 200 is provisionally stored in the common memory area 65. After being downloaded, the converter 203 exclusively usable for the device B is stored on the memory area 67 (also exclusively usable for the device B) offered to the device B 63.

Next, the image data 200 downloaded by the private server 60 is processed to be converted into image data compatible with the device A 62. For example, the original image data 200 is reduced into a predetermined size, and then converted into image data 201 having 640×480 dots of image size compatible with the display size of the device A 62. The converted image data 201 is then stored in the memory area 66 (exclusively usable for the device A) offered to the device A 61.

On the other hand, the device B 63 deals with such a specific image format. Because of this, by applying the converter 203 (exclusively usable for the device B) stored in the memory area 67 (exclusively usable for the device B), the private server 60 generates image data 202 which is provided with 160×160 dots of image size compatible with a displayable size proper to the device B 63 and a specific image format compatible with the device B 63. The generated image data 202 is then stored in the memory area 67 exclusively usable for the device B.

As described above, when the device A 62 and the device B 67 respectively generate a request for downloading the image data 200 present in the public server 61 next time, it is so arranged that a pair of image data 201 and 202 generated via conversion to be compatible with the device A 62 and the device B 67 will have already been stored in the memory area 66 exclusively usable for the device A and also in the other memory area 67 exclusively usable for the device B. Because of this arrangement, it is possible for the device A 62 and the device B 63 to respectively display the downloaded image data as the image data 201 and 202 within a short period of time.

Figure 9:
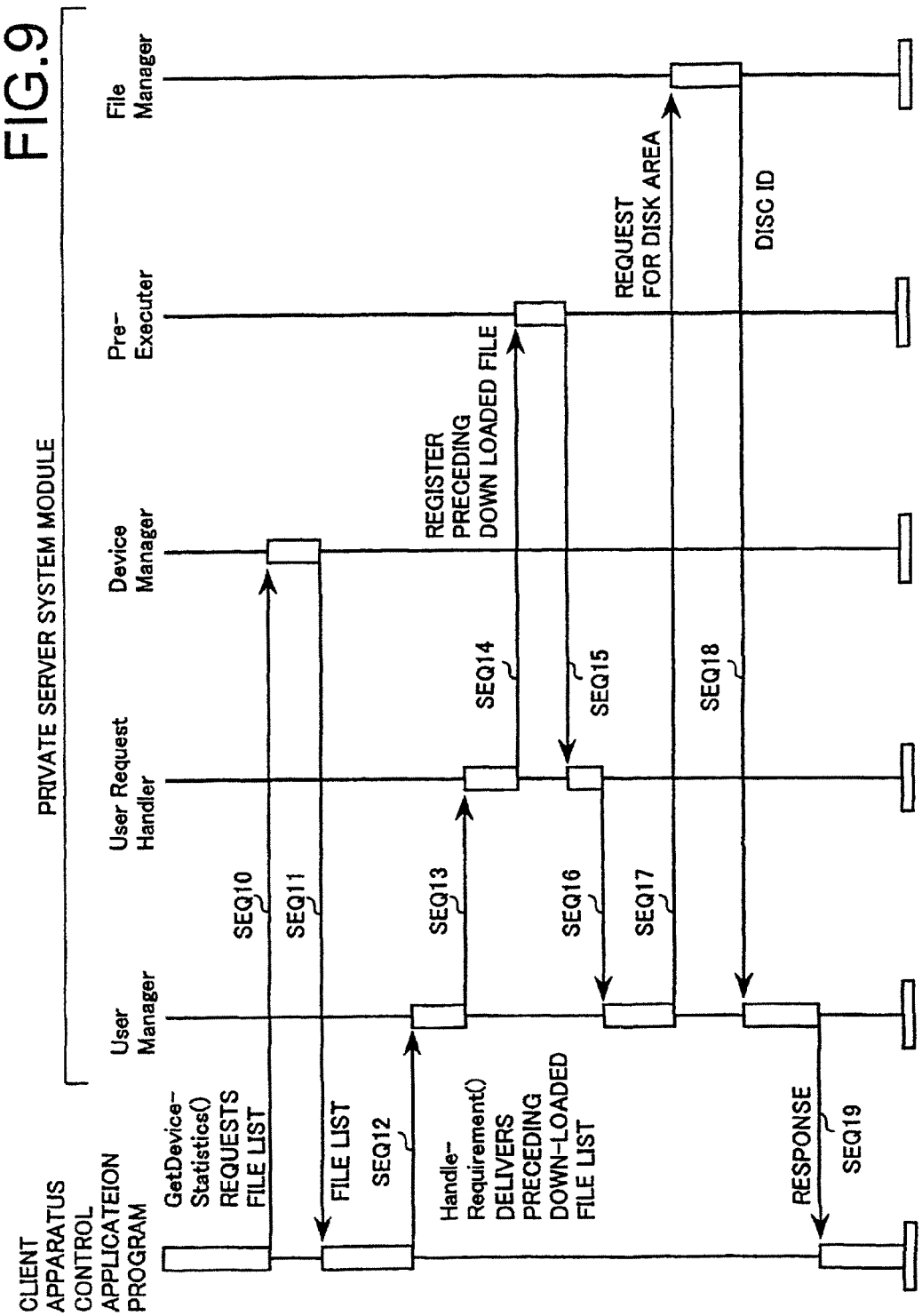
FIG. 9 is a sequence diagram of an example of data exchange operation between a controlling application program for a first information apparatus and a controlling layer module of the middle ware for the private server at a time of the advanced loading of image data.

FIG. 9 schematically exemplifies sequence of the above-referred data processing operations exchanged between the control application program 48 of the client apparatus 101 and the control layer modules of the private server middleware 40. First, when the sequence SEQ10 is entered, the control application program 48 of a client apparatus (this will merely be referred to as a "client apparatus" in the following description) calls an interface ("getDeviceStatistics( )") belonging to a module "DeviceManager" among the control layer modules of the private server middleware 40, and then, the control application program 48 requests for transmission of a list of files containing image data thus far accessed by the corresponding client apparatus. Then, in the next sequence SEQ11, based on the above request, the list is transmitted to the client apparatus.

Next, FIG. 8 is referred to over again. After transmission of the requested list to the corresponding client apparatus, the list is shown to user, and then, the client apparatus prompts user to select such files that should be downloaded in advance. When the user inputs names of selected files, by applying an interface "handleRequirement( )" belonging to a module "UserManager, a list of files that should be downloaded in advance selected by the user is transmitted to the private server 60 as the user's request. This corresponds to the sequence SEQ12 shown in FIG. 9.

In response to the user's request transmitted from the client apparatus, the private server 60 calls another module "UserRequirementHandler" by activating the module "UserManager" which constitutes one of the system constructing elements. This process corresponds to the sequence SEQ13 shown in FIG. 9.

Next, in the sequence SEQ14, the above module "UserRequirementHandler" transmits names of files that should be downloaded in advance to a module "PreExecuter". Concurrently, an identifier (device ID) of the corresponding client apparatus is also transmitted. The device ID is acquired from such a user's profile transmitted from the module "UserManager" as an interface "handleRequirement". Next, names of files and the device ID are respectively registered by the module "PreExecuter". After completing the registration, the process is shifted to the module "UserRequirementHandler" in the sequence SEQ15.

In the next sequence SEQ16, the process is provisionally transferred from the above module "UserRequirementHandler" to the module "UserManager". In the next sequence SEQ 17, the module "UserManager" requests a module "File Manager" to offer a predetermined hard disk area of the private server 60 to the corresponding client apparatus. In response to this request, the module "FileManager" allocates a predetermined hard disk area to the corresponding client apparatus. In response, the client apparatus returns an identifier (device ID) for specifying the allocated hard disk area. By way of referring to the module "DeviceManager" to check the data on the computing resources registered at the time of connecting the corresponding client apparatus, a size of the hard disk area available for the allocation is determined based on the result of the above reference.

In the next sequence SEQ19, the module "User Manager" responds to the corresponding to notify that the designated hard disk area has been allocated. It is so arranged that the above identifier (device ID) for designating the allocated hard disk area is transmitted to the corresponding client apparatus when the response is generated via the sequence SEQ19.

Figure 10:
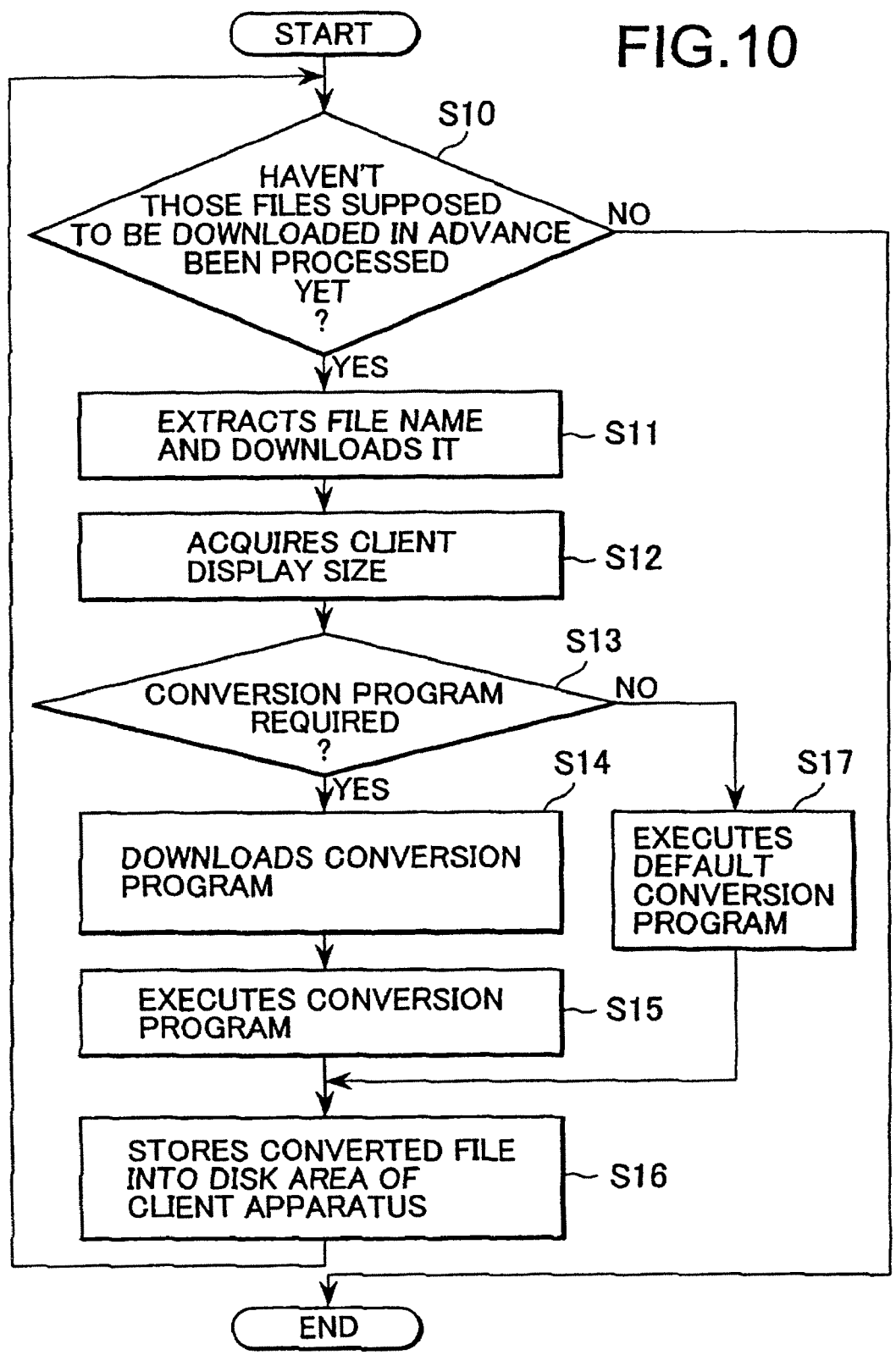
FIG. 10 is a flowchart showing an exemplary processing of a module "Pre-Executer" in an advanced downloading process.

FIG. 10 is a flowchart for exemplifying an operation of the module "PreExecuter" in the course of downloading image data in advance. Prior to the execution of the flowchart shown in FIG. 10, it is assumed that the module "PreExecuter" previously incorporates a list containing names of image files that should be downloaded in advance. The following processes are individually executed against individual files contained in the list.

In the initial step S10, it is identified whether all the files to be subjected to advanced downloading are fully processed or not. If it is identified that there are still files that should be processed, then, processing mode proceeds to step S11. If all the files are complete with the required processes, all the processes based on the flowchart shown in FIG. 10 are terminated.

In the next step S11, one of file names is extracted from the list, and then, the corresponding file is downloaded. Next, the module "PreExecuter" requests a module "NetworkLoader" to download image data 200 bearing the corresponding file name from the public server 61.

Based on this request, the module "Network Loader" downloads the corresponding image data 200 from the public server 61. The downloaded image data 200 is stored in the common memory area 65.

In the next step S12, by way of applying the device ID as an argument to the interface "getDeviceStatistics( )" of the module "DeviceManager", the module "PreExecuter" calls the corresponding client apparatus requiring downloading of data in advance, whereby a display size displayable on the client apparatus is acquired.

Next, based on the data on the display size displayable on the client apparatus requesting for downloading specific data and the data on the format of picture image, a process for converting the downloaded image data is executed. At the same time, based on the data on the client apparatus requesting for downloading specific data, it is identified whether a specific conversion program other than the default conversion program is required or not in the next step S13. For example, if the client apparatus requesting for downloading specific data corresponds to the device B 63, it is considered that the converter 203 exclusively usable for the device B should be utilized.

In the next step S13, if it is identified that a conversion program other than the default program is required, then, processing mode proceeds to step S14, in which the module "PreExecuter" requests the module "NetworkLoader" to download a predetermined conversion program. Based on this request, the module "NetworkLoader" enables the corresponding conversion program to be downloaded from the public server 61 and then stored in the memory area 67 exclusively usable for the device B, for example. When the conversion program has been downloaded, in the next step S15, the image data 200 is converted into a specific format by the conversion program by applying a CPU offered to the corresponding client apparatus.

After completing conversion of the image data 200 into a specific format, processing mode proceeds to step S16, in which the conversion completed image data 200 is stored in a disk area offered to the corresponding client apparatus. In the example shown in FIG. 10, the converter 203 exclusively usable for the device B converts the size and the format of the picture image of the image data 200, and then, the converted image data 202 is stored in the memory area 67 exclusively usable for the device B.

On the other hand, if it is identified in the above step S13 that no conversion program other than the default program is required, processing mode proceeds to step S17, in which conversion of the image data 200 is executed by applying default conversion program. The process for converting the image data 200 is executed by a CPU offered to the corresponding client apparatus. After completing conversion of the image data 200, processing mode proceeds to step S16, in which the conversion completed image data 200 is stored in a disk area offered to the corresponding client apparatus. In the example shown in FIG. 10, the default conversion program executes conversion of the image size of the image data 200, and then the conversion completed image data 200 is stored in the memory area 66 exclusively usable for the device A. The default conversion program is previously provided for the private server 60, for example.

After completing conversion of the image data 200 in the step S16, the converted image data 200 is stored in a disk area offered to individual client apparatuses upon request from the module "PreExecuter" addressed to a module "FileManager2" which executes the data storing process. In this process, an interface called "putFile( )" belonging to the module "FileManager" is utilized by way of applying the device ID as an argument.

Figure 11:
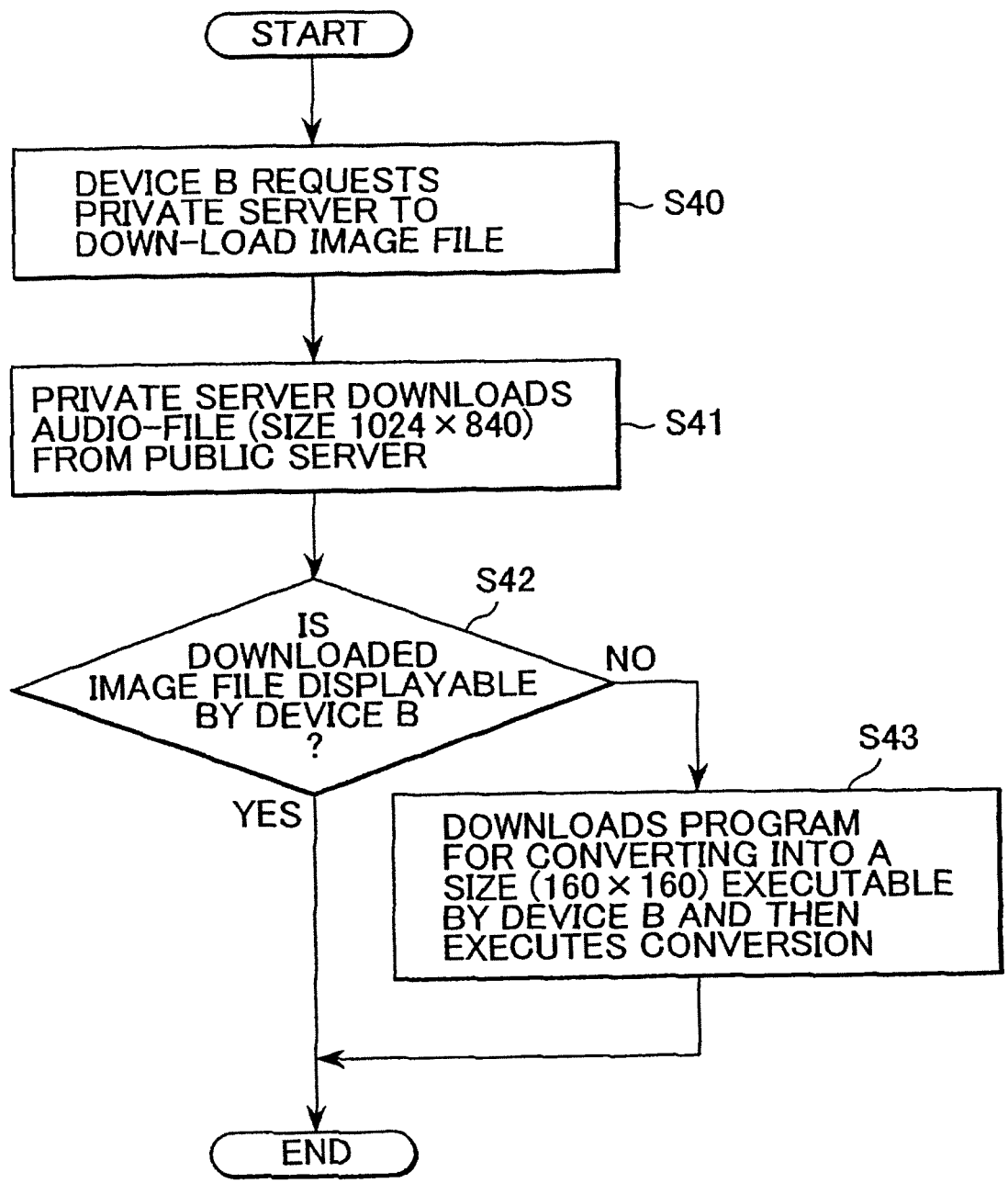
FIG. 11 is a flowchart showing an exemplary processing at a time of receiving a downloading request from a second information apparatus that requires conversion on image data upon receiving the data.

FIG. 11 presents such a flowchart for exemplifying such processes to be executed when a client apparatus in need of executing a process for converting image data requests for downloading image data. Referring now to FIG. 8 over again, the process is described by way of assuming that the device B 63 requests for downloading image data with 1024×840 dots of image size based on a standard format owned by the public server 61. First, while the initial step S40 is underway, the device B 63 requests the private server 60 to download files of image data. In the next step S41, based on the above request, the private server 60 downloads the required files from the public server 61.

After downloading the required files, in the next step S42, based on the data on the corresponding client apparatus (the device B 63) requesting for downloading image data, it is identified whether the downloaded picture data can be displayed on the device B 63 or not. The data on the client apparatus can be acquired by applying the module "DeviceManager", for example. If it is identified that the downloaded image data is not displayable on the device B 63, then the processing mode proceeds to the next step S43, in which a conversion program is downloaded. For example, in the example shown in FIG. 8, the image data based on a standard format is converted into image data format that can be displayed on the device B 63, and yet, such a converter 203 usable for the device B for converting the picture size into 160×160 dots displayable on the device B 63 is downloaded from the public server 61. Then, by applying the downloaded converter 203 usable for the device B, by way of utilizing such computing resources offered to the device B 63, the process for converting image data is executed. The conversion completed image data is then stored in a hard disk area offered to the device B 63, for example.

Figure 12:
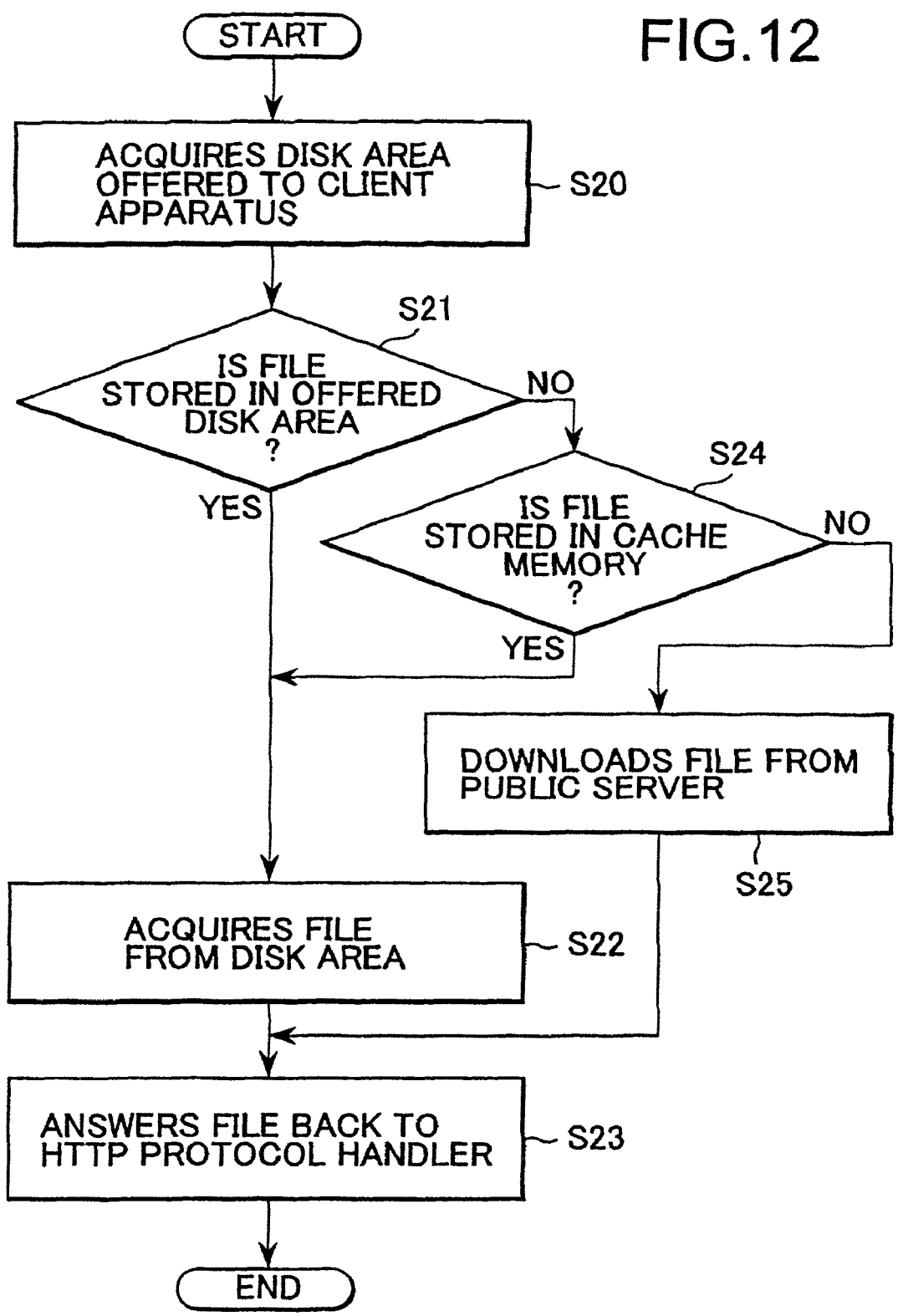
FIG. 12 is a flowchart showing an exemplary process performed by the private server at a time of loading image data downloaded in advance by the second information apparatus.

FIG. 12 presents such a flowchart for exemplifying an operation of the private server 60 when the image data previously downloaded by the client apparatus is loaded. This flowchart mainly designates an operation of the module "NetworkLoader".

Initially, a client apparatus requests an application layer of the private sever 60 for loading image data. The request from the client apparatus for loading image data is received by an http protocol handler. Next, the application layer communicates with the control layer to enable the http protocol handler to call the module "Network Loader" of the control layer module to request for downloading image data.

In the first step S20, it is identified whether there is a disk area offered to the corresponding client apparatus or not, and then the disk area is secured. For example, an identifier for designating the corresponding disk area is acquired. IN the next step S21, the module "NetworkLoader" requests the module "FileManager" to check to see whether a file of downloadable image data has already been stored in the hard disk area allocated to the corresponding client apparatus or not.

If it is identified that the downloadable file has already been stored, then, the processing mode proceeds to the next step S22, in which the corresponding file is read out from the allocated hard disk area. In the next step S23, the read-out file is delivered to the http protocol handler as a response data. The file as the response data is transmitted to the corresponding client apparatus from the private server 60 via the http protocol handler.

On the other hand, if it is identified in the step S21 that the corresponding file is not stored in the allocated hard disk area, then, the processing mode proceeds to step S24, in which it is identified whether the corresponding file is stored in a cache memory or not. The cache memory consists of a hard disk area commonly accessible by individual client apparatuses. For example, a file referred to by another client apparatus is provisionally stored in the cache memory area. If the corresponding file is stored in the cache memory area, the processing mode proceeds to the step S22, in which the corresponding file is extracted from the cache memory area. In the next step S23, the extracted file is delivered as the response to the http protocol handler. The corresponding file as the responding data is then transmitted to the corresponding client apparatus from the private server 60 via the http protocol handler.

On the other hand, if it is identified in the step S24 that the corresponding file is not stored in the cache memory area, then, the processing mode proceeds to step S25, in which the corresponding file is downloaded from the public server 61 by the private server 60. Then, the processing mode proceeds to step S23, in which the downloaded file is delivered as the response to the http protocol handler. The corresponding file as the response data is then transmitted to the corresponding client apparatus from the private server 60 via the http protocol handler.

Next, taking an audio data commissioning process between client apparatuses in reference to the above-described section (2), for example, a system for assigning audio data 300 between individual client apparatuses is exemplified below. In this system, a plurality of client apparatuses including device A 72, the device B 73, and the device C 74 are individually connected to a network 75. Further, a private server 70 consisting of a personal computer is also connected to the network 75. The private server 70 is further connected to the Internet, for example, whereby it is possible for the private server 70 to communicate with a public server 71 on the Internet.

The private server 70 has a memory device comprising a hard disk device, for example. Part of the memory area is utilized as a common memory area 76. It is so arranged that a memory area 77 usable for a device A constituting another part of the memory area of the memory device is lent to the device A 72, and further, a memory area 78 usable for a device B constituting another part of the memory area is offered to the device B 73. In this example, no memory area is offered to the device C 74.

The device A 72 consists of a client apparatus capable of playing music tunes with MIDI (musical instrument digital interface) data. The MIDI data comprises a variety of performance information such as tonal data and sound production timing data, for example. By way of feeding performance information to the corresponding sound source, the MIDI data enables music tunes to be played properly. It is so arranged that the device A 72 incorporates a sound source corresponding to the MIDI data and speakers, for example, in order to play music tunes by activating the sound source in accordance with the input MIDI data.

The device B 73 consists of a client apparatus capable of reproducing the MP3 (Moving Pictures Experts Group 1 Audio Layer 3) data. The MP3 comprises an algorithm for compressing vocal-portion data of the MPEG1 (Moving Pictures Experts Group 1) and the MPEG2 respectively constituting the system for encoding digital image data. By way of incorporating a decoder compatible with the MP3 data format and speakers, the device B 73 reproduces the decoded MP3 audio data via speakers.

On the other hand, the device C 74 consists of a client apparatus devoid of audio-data reproducing means such as speakers.

Figure 13:
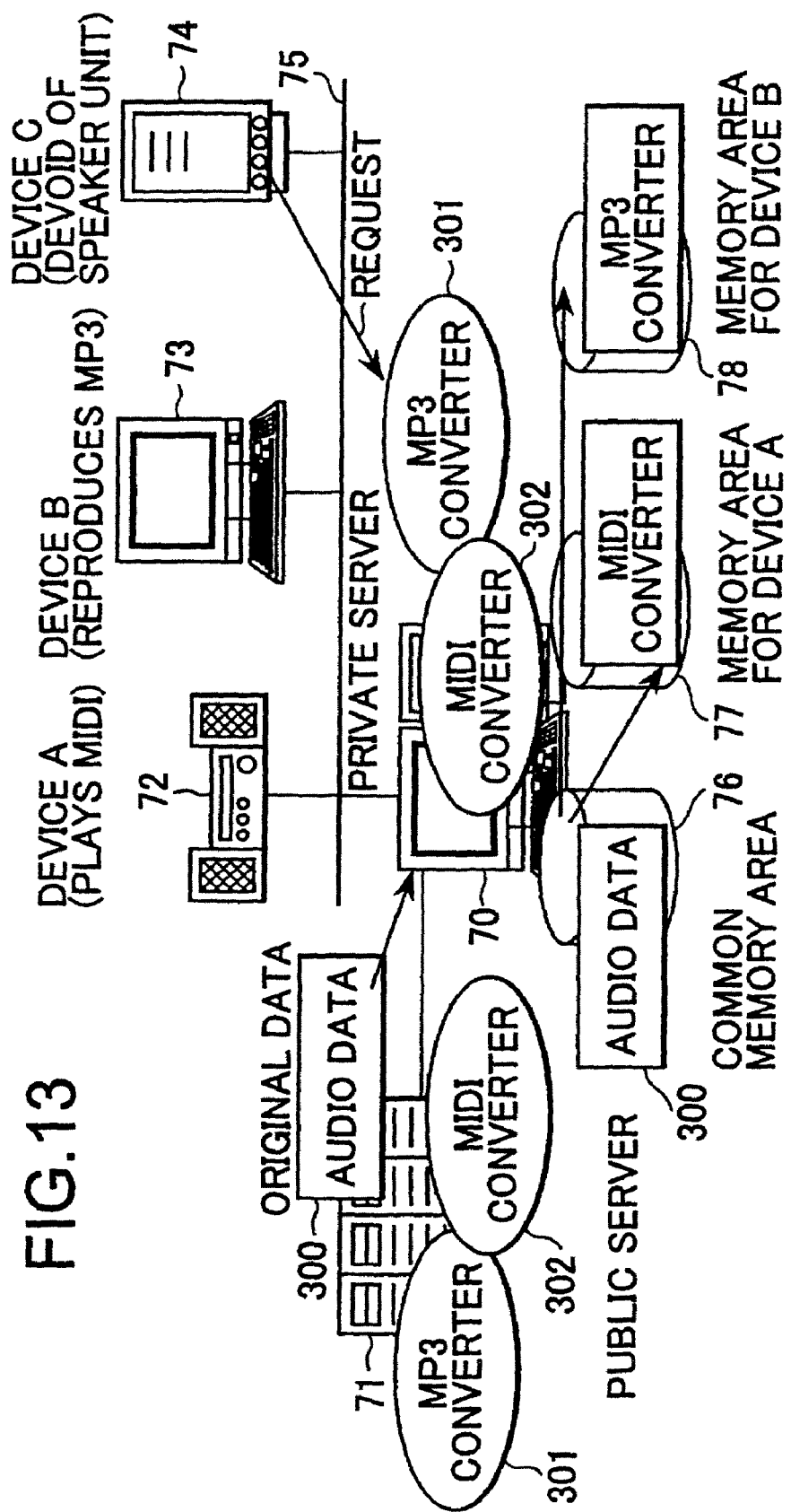
FIG. 13 is a schematic diagram showing an exemplary system in a case of assignment of audio data between the second information apparatuses.

In the above system, when downloading the audio data 300 to a client apparatus, a case is considered, where the private server 70 detects that the client apparatus requesting for downloading the audio data 300 is devoid of audio-data reproducing means such as speakers. FIG. 13 exemplifies that the device C 74 is devoid of the audio-data reproducing means.

For example, it is assumed that one of the client apparatuses connected to the network 75 delivers a list of apparatuses incorporating audio-data reproducing means, such as speakers, to the device C 74 to which a user requests for downloading the audio data 300. In response, among the listed apparatuses, the user selects a client apparatus capable of generating audio output in place of the device C 74 presently being used by the user. The name of the selected client apparatus is fed back to the private server 70. In this case, it is assumed that the device B 73 has been selected.

The private server 70 enables the public server 71 to download audio data 300. Concurrently, in conjunction with the audio data 300, a data converting program 301 compatible with the required data format is also downloaded. Using the concurrently downloaded data converting program 301, the downloaded audio data 300 is converted into the MP3 data format with which the device B 73 selected as the client apparatus for generating audio output is compatible. The converted audio data is stored in a hard-disk area offered to individual client apparatuses.

As a result of executing the above processes, by applying the device B 73, the user is enabled to reproduce the audio data 300 downloaded at the moment of activating the device B 73. In this way, reproduction of the audio data 300 under the request from the device C 74 for downloading thereof is assigned to the device B 73.

Instead of being downloaded to the corresponding client apparatus, the audio-data converting program 301 is stored in a hard disk area 78 of the private server 71, where the hard disk area 78 is allocated and offered to the corresponding client apparatus, i.e., the device B 73, from the private server 71. The data converting program 301 is executed by applying a CPU offered to the corresponding apparatus, i.e., the device B 73. In a case where the audio data 300 is convertible into the MIDI format data, it is possible to select the device A 72 as a destination of output audio data. In this case, as was done for the above process, a conversion program 302 for converting the audio data 300 into the MIDI format data is downloaded in conjunction with the audio data 300.

Figure 14:
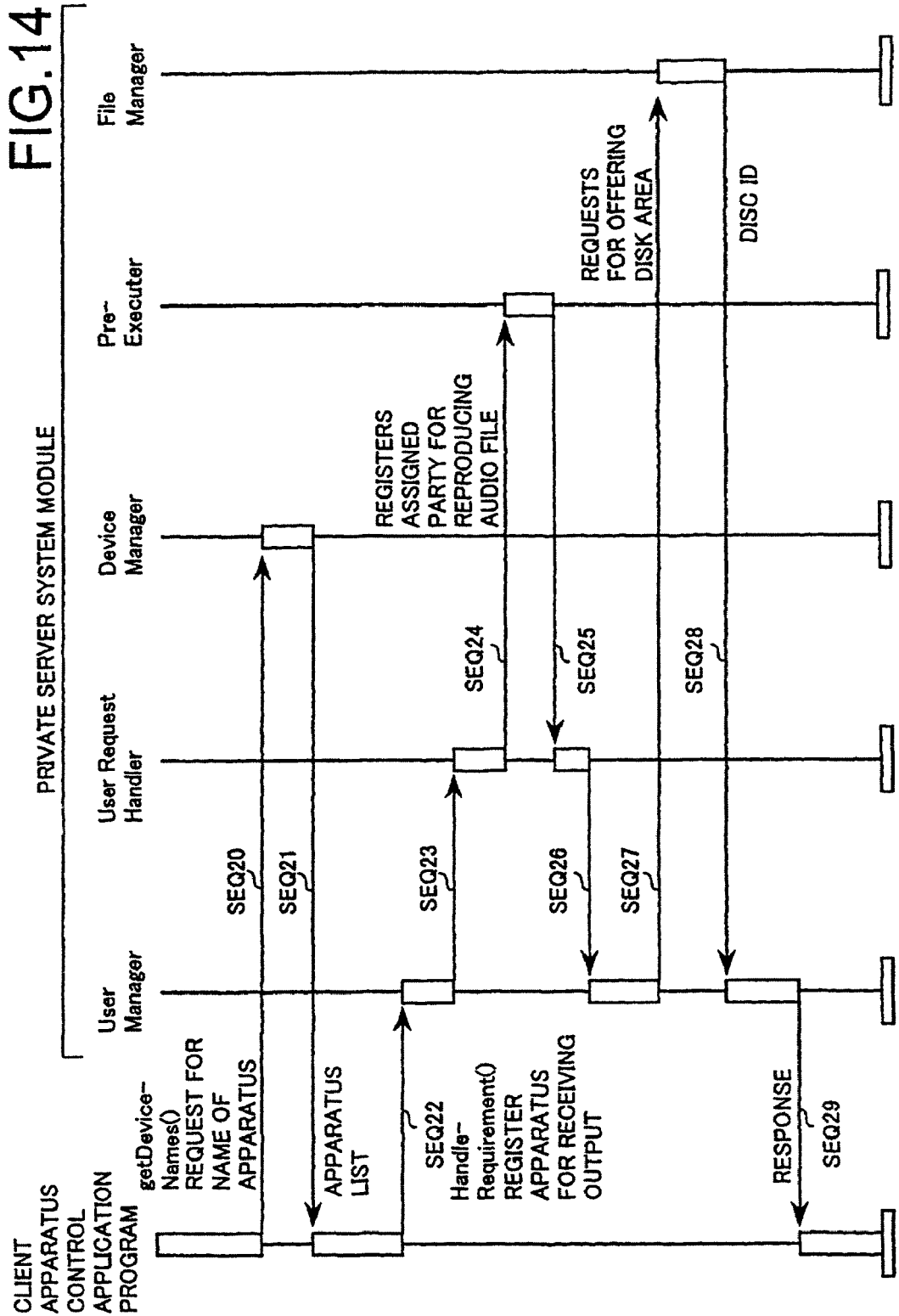
FIG. 14 is a sequence diagram showing exchanging of audio data between the controlling application program of the second information apparatus and the controlling layer module of the middle ware for the private server in the case of assignment of audio data between the second information apparatuses.

FIG. 14 exemplifies a sequence of processes executed between the control application program 48 of a client apparatus and the control layer module of the private server middleware 40. In the initial sequence SEQ20, the control application program 48 of the client apparatus calls an interface "getDeviceStatistics( )" of the module "DeviceManager" in the control layer module of the private server middleware 40. Then, the control layer module requests to transmit a list of apparatuses capable of reproducing audio data, such as those incorporating speakers, among those client apparatuses connected to the network 75. For example, such argument for designating such condition specifying "incorporating speakers" is delivered via the interface "getDeviceStatistics". Based on the above request, the list is transmitted to the corresponding client apparatus in the sequence SEQ21.

After acquiring the list, the list is shown to the user. The client apparatus then prompts the user to select an apparatus for generating audio output. When the user inputs the selected apparatus, using an interface called "handleRequirement( )" belonging to the module "UserManager", a list of the client apparatus for generating audio output selected by the user is transmitted to the private server 60 as the user request. This process corresponds to the sequence SEQ22.

On receipt of the above list fed back from the client apparatus as the user's request, in the next sequence SEQ23, by applying the module "UserManager" as one of the system constructing elements, the private server 60 calls another module "UserRequirementHandler".

In the next sequence SEQ24, the above module "UserRequirementHandler" causes an identifier (device ID) of the client apparatus for generating audio output fed back from the user and the other device ID of the other client apparatus requesting for downloading audio data to be transmitted to the module "NetworkLoader". Based on these data, the device ID of the client apparatus for generating audio output as the eventual outlet of audio files is registered by the module "NetworkLoader" as the one for generating audio output of the client apparatus requesting downloading of the audio files. The effect of this registration is fed back to the module. "UserRequirementHandler" in the course of the sequence SEQ25.

In the next sequence SEQ26, execution of the process is provisionally transferred from the module "User RequirementHandler" to the module "UserManager". In the next sequence SEQ27, the module "UserManager" requests the module "FileManager" to offer part of the hard disk area of the private server 70 to the corresponding client apparatus. In response to this request, the module "FileManager" allocates part of the hard disk area of the private server 70 to the corresponding client apparatus. In response, the identifier (disk ID) for designating the allocated hard disk area is fed back to the module "FileManager". By way of referring the data on the computing resources registered at the time of connecting the corresponding client apparatus to the module "DeviceManager", size of the hard disk area subject to allocation is determined based on the referred contents.

In the next sequence SEQ29, the module "UserManager" transmits its reply to the corresponding client apparatus by way of notifying that the eventual outlet of the audio output has been determined and that the usable hard disk area has been allocated.

The process for downloading files of audio data and conversion program executed in advance by the module "PreExecuter" is substantially identical to the progress for downloading picture data described earlier in the flowchart shown in FIG. 10. More particularly, the module "PreExecuter" requests the module "Network Loader" to download files of audio data and the corresponding conversion program. Based on this request, the module "Network Loader" downloads the corresponding audio data files and conversion program.

By applying the downloaded conversion program, the audio data downloaded by the module "PreExecuter" is converted into audio data based on a predetermined format. Conversion of audio data is executed by applying computing resources including the CPU ability, a memory area, and a disk area offered to a client apparatus requesting for downloading audio data files from the private server 70. After completing the converting process, the module "PreExecuter" requests the module "FileManager" to store the audio data files complete with the converting process in the hard disk area offered to the corresponding client apparatus. Concurrently, an interface called "putFile( )" belonging to the module "FileManager" utilizes the device ID as an argument.

Figure 15:
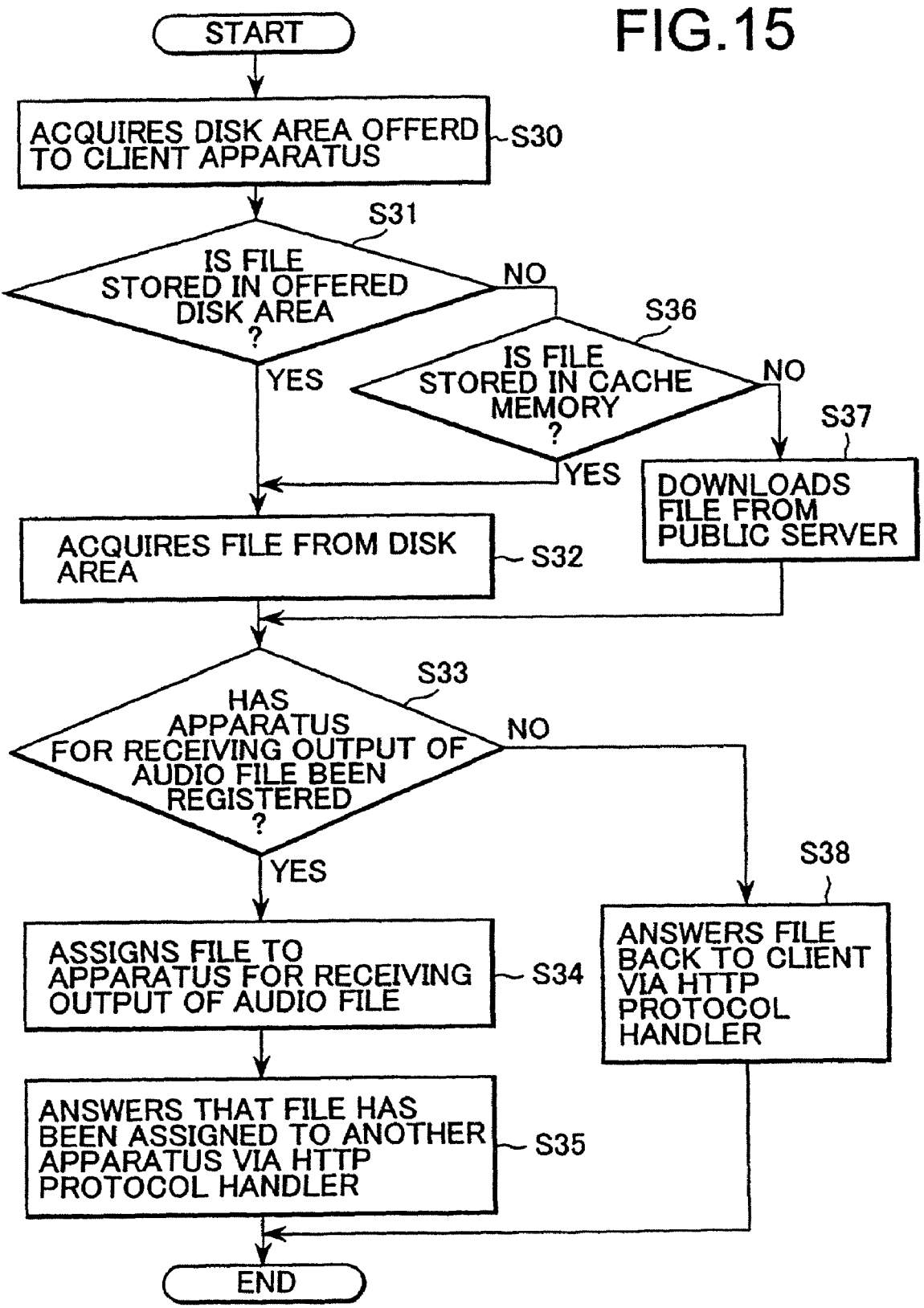
FIG. 15 is a flowchart showing an exemplary processing performed by the private server (the first information apparatus) at a time of loading audio data downloaded in advance by the second information apparatus.

FIG. 15 presents a flowchart for exemplifying serial processes of the private server 70 when previously downloaded audio data is loaded by a corresponding client apparatus. This flowchart mainly describes operation of the module "NetworkLoader".

Initially, a client apparatus requests an application layer of the private server 70 to load audio data. The request from the client apparatus for loading audio data is received by the http protocol handler. Next, the application layer communicates with the control layer to enable the http protocol handler to call the module "NetworkLoader" of the control layer modules, whereby downloading of audio data is requested.

In the first step S30, it is identified whether there is a hard disk area offered to the corresponding client apparatus or not. If it is identified so, the hard disk area is secured. For example, an identifier for designating the corresponding disk area is secured. In the next step S31, the module "NetworkLoader" requests the module "FileManager" to check to see whether a loadable audio data file has already been stored in the hard disk area allocated to the corresponding client apparatus or not.

If it is identified in the step S31 that the loadable audio data file has already been stored in the above hard disk area, then, processing mode proceeds to step S36, in which it is identified whether the corresponding audio data file has been stored in a cache memory or not. If it is identified so, processing mode proceeds to step S32 to extract the corresponding audio data file from the cache memory, and the process goes to the next step S33.

On the other hand, if it is identified in the step S31 that the corresponding audio data file is not stored in the hard disk area, then processing mode proceeds to step S36 to check to see whether the file is stored in the cache memory area or not. If it is identified so, then, the process goes to step S32 to extract the corresponding file from the cache memory area to proceed the processing mode to step S33.

On the other hand, if it is identified in the step S36 that the corresponding file is not stored in the cache memory area, then, processing mode proceeds to step S37, in which the private server 70 causes the corresponding file to be downloaded from the public server 71, and then, processing mode proceeds to step S33.

In the step S33, the module "NetworkLoader" checks to see whether the eventual outlet of the audio data has already been registered or not. If it is identified that a consignee of the audio data has not yet been registered, then, the process goes to step S38, in which the corresponding audio data file is returned to the client apparatus which requested for downloading audio data as a response via the http protocol handler.

On the other hand, if it is identified in the step S33 that the client apparatus corresponding to the eventual outlet of audio data has already been registered, then, the process goes to step S34, in which the corresponding audio data file is assigned to the client apparatus already registered as the eventual outlet of audio data output. For example, the corresponding audio data file is stored in the hard disk area offered by the private server 70 to the client apparatus registered as the outlet of audio data output. In the next step S35, the client apparatus that requested for downloading audio data is notified that the corresponding audio data file has been assigned to another client apparatus via the http protocol handler.

Figure 16:
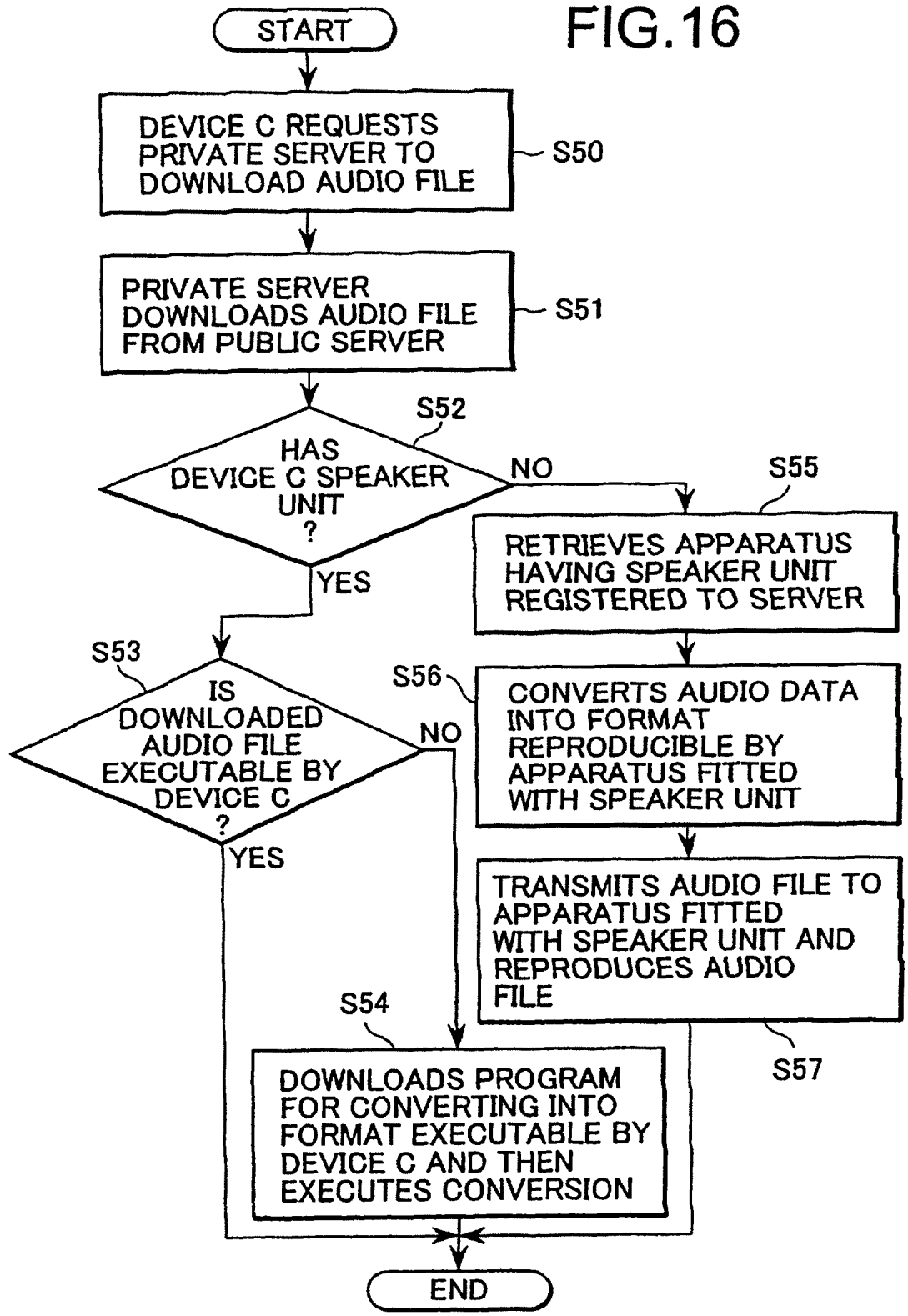
FIG. 16 is a flowchart showing an exemplary processing when a second information apparatus having no audio output means requests downloading of audio.

FIG. 16 presents a flowchart for exemplifying such serial processes executed when a client apparatus devoid of audio output means such as speakers requests for downloading audio data. Based on an assumption that the device C 74 shown in FIG. 13 requests for down loading audio data, serial processes shown in the flowchart are described below. In the first step S50, the device C 74 requests the private server 70 to download a certain audio data file. In the next step S51, based on this request, the private server enables the public server 71 to download the corresponding audio data file.

In the next step S52, based on the data on the device C 74 requesting for downloading the corresponding audio data file, the private server 79 checks to see whether the device C 74 incorporates audio data output means such as speakers or not. If it is identified that the device C 74 incorporates an audio data output means, processing mode proceeds to step S53, in which it is identified whether the downloaded audio data can be reproduced by the device C 74 or not. For example, based on the data on the device C 74, it is identified whether the device C 74 is compatible with the format of the downloaded audio data or not. The module "DeviceManager" can acquire data on the device C 74 in the steps S52 and S53.

If the device C 74 is identified to be compatible with the format of the downloaded audio data, then, the corresponding audio data file is stored in a hard disk area offered to the device C 74, for example. If the device C 74 is connected to the 75, it is allowable to deliver the corresponding audio data file directly to the device C 74.

On the other hand, if it is identified in the step S53 that the device C 74 is not compatible with the format of the downloaded audio data file, then, the process goes to step S54, in which the private server 70 downloads a conversion program for converting the downloaded audio data into a format reproducible by the device C 74 from the public server 71. This enables the operating system to execute the format-converting process by way of utilizing such computing resources offered to the device C 74.

If it is identified in the preceding step S52 that the device C74 is devoid of audio signal output means speakers, then, the process goes to step S55. While the step S55 is underway, the private server 70 retrieves a client apparatus that is already registered to the private server 70 and provided with audio data output means such as speakers. In the next step S56, based on the retrieved result, the corresponding audio data is converted into a format reproducible by a client apparatus incorporating audio data output means. In the next step S57, the format-converted audio data is transmitted to a client apparatus incorporating audio data output means to enable the format-converted audio data to be reproduced by the corresponding client apparatus.

As described above in details, according to the present invention, unlike such a conventional software platform available for any of the conventional domestic network service lines formed as the distributing computer system in the past, the present invention has enabled to construct an unprecedented computing resources offering system incorporating dynamic adaptability capable of properly dealing with user's request and physical change of connected apparatuses so as to provide an important function in the domestic network.

What is claimed is:

1. A data processing system for utilizing computing resources within a domestic network connected to the internet, comprising:
    a private server connected to the domestic network, the private server having a first computing resource operable for use as a shared computing resource;
    a client apparatus connectable to the domestic network, the client apparatus having a second computing resource for use by the client apparatus;
    sharing unit to share the first computing resource with the client apparatus based on a request to the private server from the client apparatus; and
    condition notifying unit to identify a connection condition of the client apparatus among a plurality of connection conditions and to notify the private server of the identified connection condition, wherein the plurality of connection conditions includes:
        a first condition in which the client apparatus is connected to the domestic network and the private server renders a predetermined service to the client apparatus using the first computing resource;
        a second condition in which the client apparatus is provisionally disconnected from the domestic network and the private server continues to render the predetermined service using the first computing resource; and
        a third condition in which the client apparatus is disconnected from the domestic network and the private server suspends to render the predetermined service using the first computing resource.

2. The data processing system of claim 1, wherein:
    when the private server is notified the client apparatus is provisionally disconnected from the domestic network, the private server continues sharing the first computing resource with the client apparatus; and
    when the private server is notified the client apparatus is disconnected from the domestic network, the private server suspends sharing of the first computing resource with the client apparatus.

3. A data processing system for utilizing computing resources within a domestic network connected to the internet, comprising:
    a private server connected to the domestic network, the private server having a first computing resource operable for use as a shared computing resource;
    a client apparatus connectable to the domestic network, the client apparatus having a second computing resource for use by the client apparatus;
    sharing unit to share the first computing resource with the client apparatus based on a sharing request to the private server from the client apparatus; and
    communication unit to communicate between the private server and the client apparatus the following data:
        first data indicating a status of the second computing resource of the client apparatus;
        second data indicating statistical results of access by the client apparatus to the private server; and
        third data indicating a connection condition of the client apparatus among a plurality of connection conditions to the domestic network, wherein the plurality of connection conditions includes:
            a first condition in which the client apparatus is connected to the domestic network and the private server renders a predetermined service to the client apparatus using the first computing resource;
            a second condition in which the client apparatus is provisionally disconnected from the domestic network and the private server continues to render the predetermined service using the first computing resource; and
            a third condition in which the client apparatus is disconnected from the domestic network and the private server suspends to render the predetermined service using the first computing resource.

4. The data processing system according to claim 3, wherein:
    the client apparatus incorporates a control application program for sending the sharing request and reporting changes in the connection condition to the private server; and
    the private server incorporates a first layer module for communicating with and supporting the control application program of the client apparatus and a second layer module for controlling the computing resources of the domestic network.

* * * * *